United States Patent
Lieber-Dembo et al.

(10) Patent No.: US 11,726,743 B2
(45) Date of Patent: *Aug. 15, 2023

(54) MERGING MULTIPLE SORTED LISTS IN A DISTRIBUTED COMPUTING SYSTEM

(71) Applicant: Cloudera, Inc., Santa Clara, CA (US)

(72) Inventors: Adar Lieber-Dembo, San Francisco, CA (US); Todd Lipcon, Oakland, CA (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,999

(22) Filed: Apr. 11, 2022

(65) Prior Publication Data

US 2022/0334796 A1 Oct. 20, 2022

Related U.S. Application Data

(63) Continuation of application No. 16/775,141, filed on Jan. 28, 2020, now Pat. No. 11,301,210.

(60) Provisional application No. 62/934,887, filed on Nov. 13, 2019.

(51) Int. Cl.
*G06F 7/08* (2006.01)
*G06F 16/22* (2019.01)

(52) U.S. Cl.
CPC ............ *G06F 7/08* (2013.01); *G06F 16/2282* (2019.01)

(58) Field of Classification Search
CPC .................................. G06F 16/278; G06F 7/36

USPC ......................................................... 707/753
See application file for complete search history.

(56) References Cited

U.S. PATENT DOCUMENTS

| | | | |
|---|---|---|---|
| 10,684,787 B1* | 6/2020 | Li | G06F 3/064 |
| 11,301,210 B2* | 4/2022 | Lieber-Dembo | G06F 7/08 |
| 2017/0109378 A1* | 4/2017 | Brewster | G06F 16/217 |
| 2021/0141602 A1* | 5/2021 | Lieber-Dembo | G06F 16/24553 |

* cited by examiner

*Primary Examiner* — Hung T Vy
(74) *Attorney, Agent, or Firm* — Perkins Coie LLP

(57) ABSTRACT

A technique is described for merging multiple lists of ordinal elements such as keys into a sorted output. In an example embodiment, a merge window is defined, based on the bounds of the multiple lists of ordinal elements, that is representative of a portion of an overall element space associated with the multiple lists. Lists of elements to be sorted can be placed into one of at least two different heaps based on whether they overlap the merge window. For example, lists that overlap the merge window may be placed into an active or "hot" heap, while lists that do not overlap the merge window may be placed into a separate inactive or "cold" heap. A sorted output can then be generated by iteratively processing the active heap. As the processing of the active heap progresses, the merge window advances, and lists may move between the active and inactive heaps.

20 Claims, 15 Drawing Sheets

| tweet_id | user_name | created_at | text |
|---|---|---|---|
| INT64 (PK) | STRING | TIMESTAMP | STRING |
| 1 | ApacheKudu | 123456589 | ICYMI: Kudu is now in production at @Xiaomi! |
| ... | ... | ... | ... |
| 999 | CaskData | 123456789 | CDAP 3.3.0 is released! |
| 1000 | TheASF | 123456789 | CFP for @ApacheCon closes 12 February |
| ... | ... | ... | ... |
| 1999 | ApacheParquet | 123456789 | 5 Reasons to Choose Parquet for Spark SQL |
| 2000 | ApacheDrill | 123456789 | How-to: Query dates w SQL on JSON document |
| ... | ... | ... | ... |
| 2999 | ApachePhoenix | 123456789 | Optimization for time-series data in Phoenix 4.6 |
| 3000 | mike_percy | 123456789 | Tomorrow, 6 PM #BigData App #meetup |
| ... | ... | ... | ... |
| 3999 | ApacheImpala | 123456789 | Impala 2.3 supports nested types on Parquet! |

Tablet 1: rows 1–999
Tablet 2: rows 1000–1999
Tablet 3: rows 2000–2999
Tablet 4: rows 3000–3999

DiskRowSet max. size = 64MB

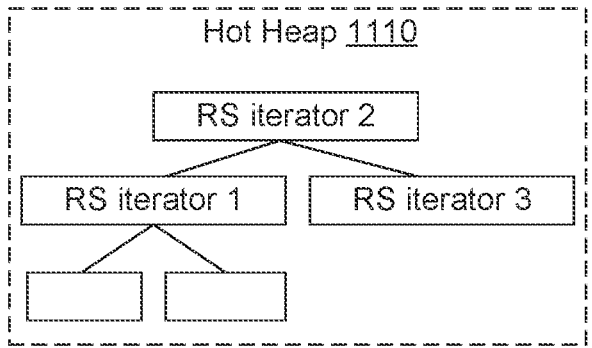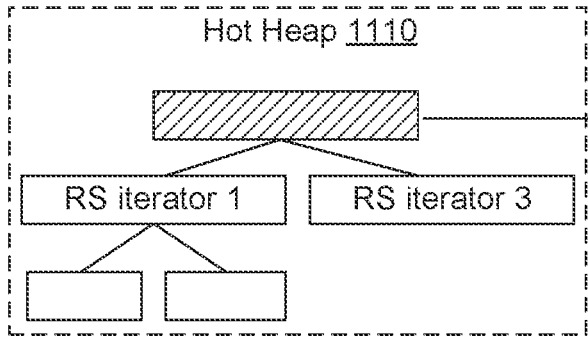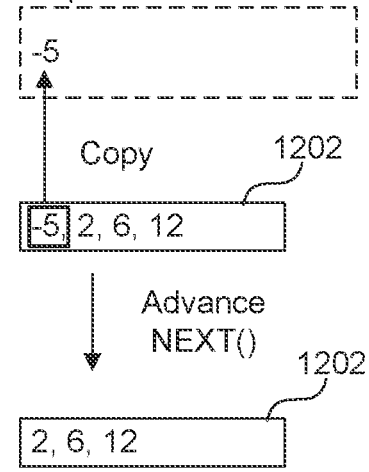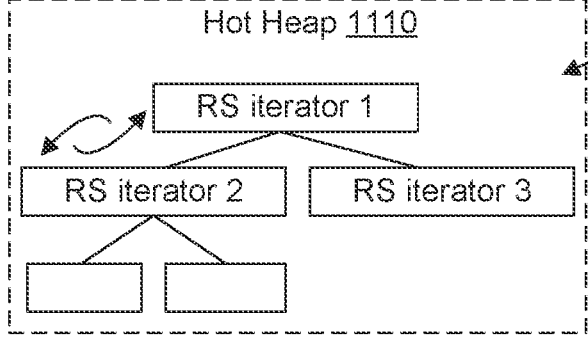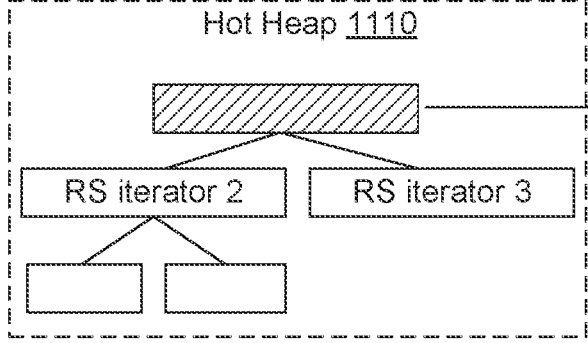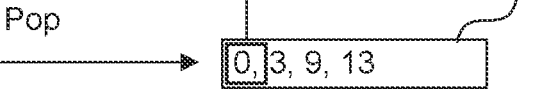
FIG. 12

MERGING MULTIPLE SORTED LISTS IN A DISTRIBUTED COMPUTING SYSTEM

CROSS-REFERENCE TO RELATED APPLICATION(S)

This application is a continuation of U.S. patent application Ser. No. 16/775,141 titled "MERGING MULTIPLE SORTED LISTS IN A DISTRIBUTED COMPUTING SYSTEM," filed Jan. 28, 2020, now U.S. Pat. No. 11,301,210, and claims the benefit of U.S. Provisional Application No. 62/934,887 titled, "OPTIMIZATIONS FOR MERGING MULTIPLE SORTED LISTS IN A DISTRIBUTED STORAGE ENGINE," filed Nov. 13, 2019, all of which are hereby incorporated by reference in their entirety.

TECHNICAL FIELD

Embodiments of the present disclosure generally relate to a technique for efficient handling of data in distributed computing systems. More specifically, embodiments of the present disclosure relate to improvements in such systems in performing scanning of multiple lists of elements to produce a sorted output.

BACKGROUND

The need for better data processing and storage services and those that provide greater storage capacity have substantially increased in recent times. Furthermore, as a decentralized approach to data storage becomes more prevalent, distributed databases such as those designed using cloud-based storage systems have become an industry standard. In distributed, large-scale storage systems, improved indexing mechanisms are usually implemented to decrease latency (i.e., time to access data). When performing a read operation, for example, a storage system can look for queried data using an in-memory index mapped to various data nodes distributed across a network. Projects like Apache Kudu™, Apache HBase™, etc., provide both the software and the software framework for reliable, scalable, and distributed processing of large data sets in a network of computers, or clusters communicating over the Internet.

BRIEF DESCRIPTION OF THE DRAWINGS

FIG. 7 shows an illustration of an example database table that may be stored, for example, in the distributed computing system of FIG. 5;

FIGS. 8A and 8B show snapshots of an example table that further illustrate an example structure of a table that may be stored, for example, in the distributed computing system of FIG. 5;

FIG. 12 shows a diagram that illustrates a sequence of states of a min-heap of per-rowset iterators during an example ordered scan process;

DETAILED DESCRIPTION

Overview

Distributed storages systems enable clients to access queried data that is distributed across multiple nodes in a cluster. In some situations, a query may require returning a single sorted output from multiple lists of data. This is commonly referred to as a "merge query" and involves applying an ordered scan process to the multiple lists of data to produce a sorted output. In systems storing relatively large amounts of data (e.g., involving millions of entries and gigabytes of data), performing ordered scans can significantly strain computing resources resulting in poor overall system performance.

Figure 1:
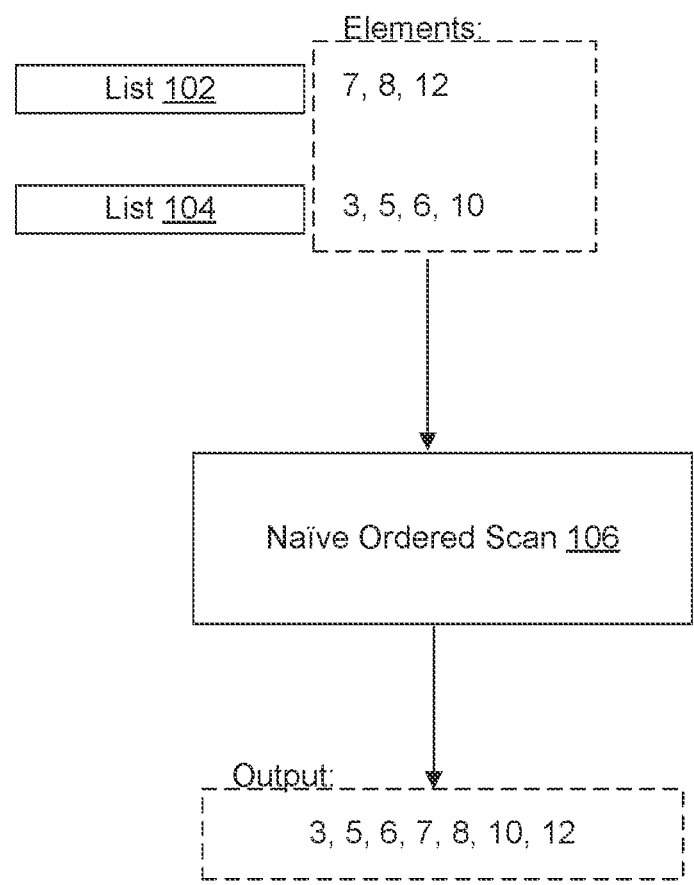
FIG. 1 shows a diagram that illustrates a naïve ordered scan of elements from multiple lists.

A simple existing approach includes performing a naïve ordered scan of all of the elements in each of multiple lists to produce an ordered output. In a naïve ordered scan, all the multiple lists are iterated to find the globally minimal element and that globally minimal element is read into an ordered output. This process is repeated until all the lists are empty (i.e., all elements are read into the ordered output). FIG. 1 shows a diagram that illustrates an example naïve ordered scan approach. As shown in FIG. 1, two lists, 102 and 104, each include a set of elements. Specifically, list 102 includes elements "7," "8," and "12," and list 104 includes elements "3," "5," "6," and "10." To produce an ordered output, the two lists 102 and 104 are processed using a naïve ordered scan 106. In other words, the two lists are iterated to find the globally minimal element (in this case "3"). The globally minimal element is then read into the ordered output and this process id repeated until each element is read from each list into the ordered output (i.e., "3, 5, 6, 7, 8, 10, 12"). A naïve ordered scan of n lists will run in O(n^2) time, which while perhaps acceptable for the simple set of elements depicted in FIG. 1, becomes exponentially more computationally expensive as the number of lists and elements increases.

Figure 2:
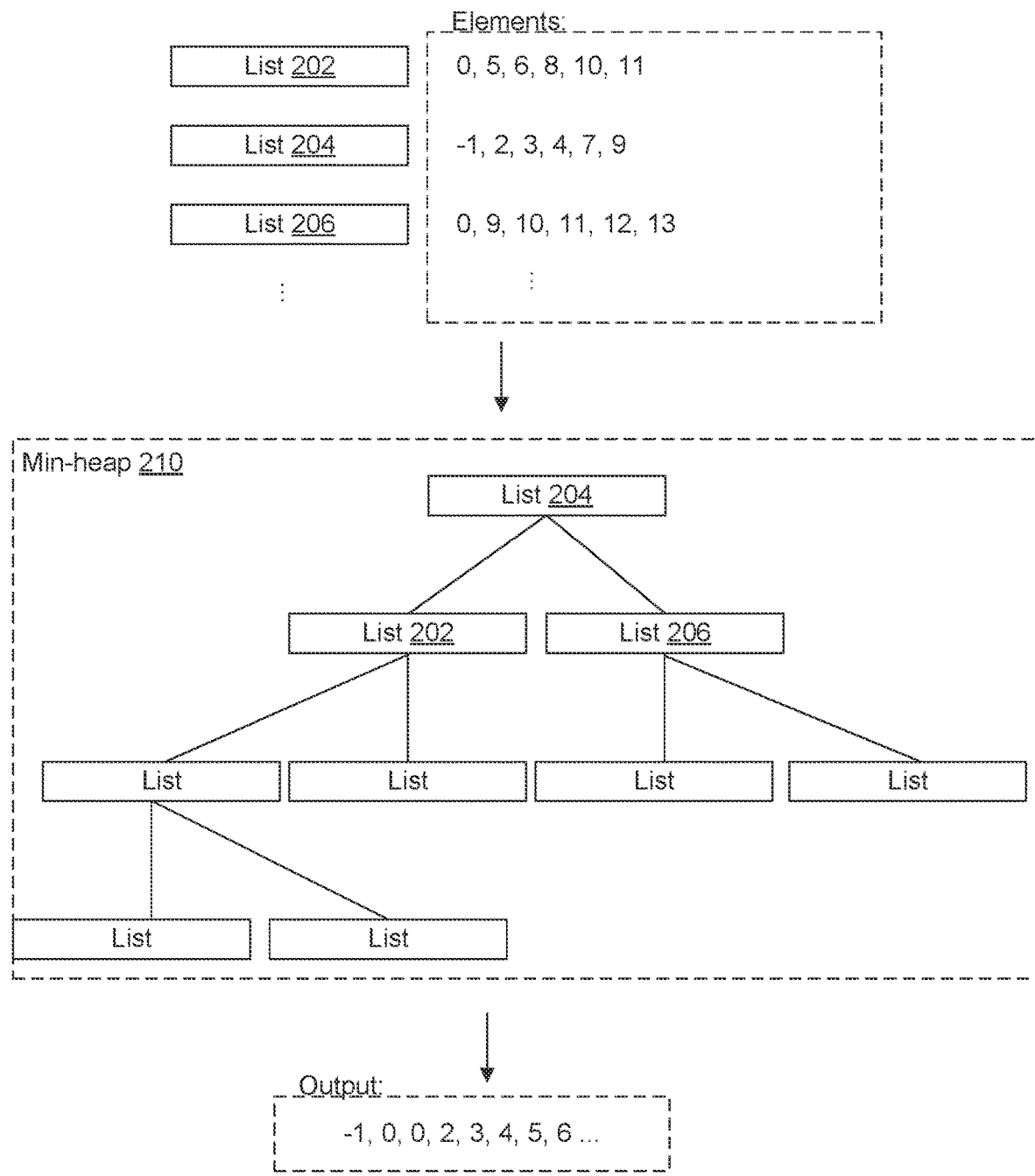
FIG. 2 shows a diagram that illustrates an existing heap-based ordered scan of elements from multiple lists.

An alternative approach includes performing a heap-based ordered scan using a single heap. FIG. 2 shows a diagram that illustrates an example existing heap-based ordered scan approach. As shown in FIG. 2, multiple lists 202, 204, 206, etc., each include a set of ordinal elements, such as keys or other sortable data. An existing heap-based approach begins by peeking at the first element in each of the multiple lists and reading that element into a per-list buffer. Next, each list is placed into a single min-heap 210 that is ordered based on the per-list buffers. In other words, the top entry of the min-heap 210 (accessible in O(1) time) will be the list containing the smallest non-exhausted element. In the example depicted in FIG. 2, the top entry in min-heap 210 is list 204 since that list has the smallest element (i.e., "−1").

Once the min-heap 210 is populated, the existing heap-based approach performs the merge by: 1) popping the top-most list (e.g., list 204) from the min-heap 210, copying that list's peeked element from the per-list buffer to the output, 2) peeking the list's next element into the per-list buffer, and 3) discarding the list if the list is empty or placing the list back into the min-heap 210 (at a location based on the peeked next element in the per-list buffer) if the list still has more elements.

This process is performed in a loop until all of the lists are discarded (i.e., the min-heap 210 is empty). The result is an ordered output of elements (e.g., keys) read from each per-list buffer during the merge loop. This type of existing heap-based approach performed on n lists runs in O(n log n) time and is therefore generally superior to a naïve O(n^2) merge from a latency perspective. Still, this existing heap-based approach requires that all peeked elements remain resident in memory during the merge which, in situations involving many lists and relatively large amounts of data, can significantly impact memory usage and affect processing performance. Another downside of the existing heap-based approach is that the amount of heap motion (i.e., shuffling of lists up and down the heap) scales with the number of lists. In other words, as the number of lists goes up, the amount of processing required to reorder lists within a heap will similarly increase.

To address the issues with existing approaches, a technique is introduced for merging multiple lists into a sorted output that involves using a merge window to separate a set of lists into multiple heaps. In an example embodiment, a "merge window" is defined that is representative of a portion of an element space associated with the multiple lists. In the context of key elements, this merge window can be conceptualized as a portion of an overall keyspace (i.e., a keyspace interval) within which a list with the smallest key is expected to be found. Using this merge window concept, lists including elements to be sorted can be placed into one of at least two different heaps based on whether they overlap the merge window at any given time. Specifically, lists that overlap the merge window may be placed into an active or "hot" heap, while lists that do not overlap the merge window may be placed into a separate inactive or "cold" heap. An advantage of the introduced technique is that it reduces the amount of heap motion (and associated required processing) compared to an existing heap-based approach. By identifying certain lists that are irrelevant to the current merge process (i.e., whose elements are outside of the merge window) and placing those lists in an inactive "cold" heap, the introduced technique reduces the number of lists in an active "hot" heap and thereby reduces the amount of heap motion (i.e., shuffling of lists up and down the active heap).

Figure 3:
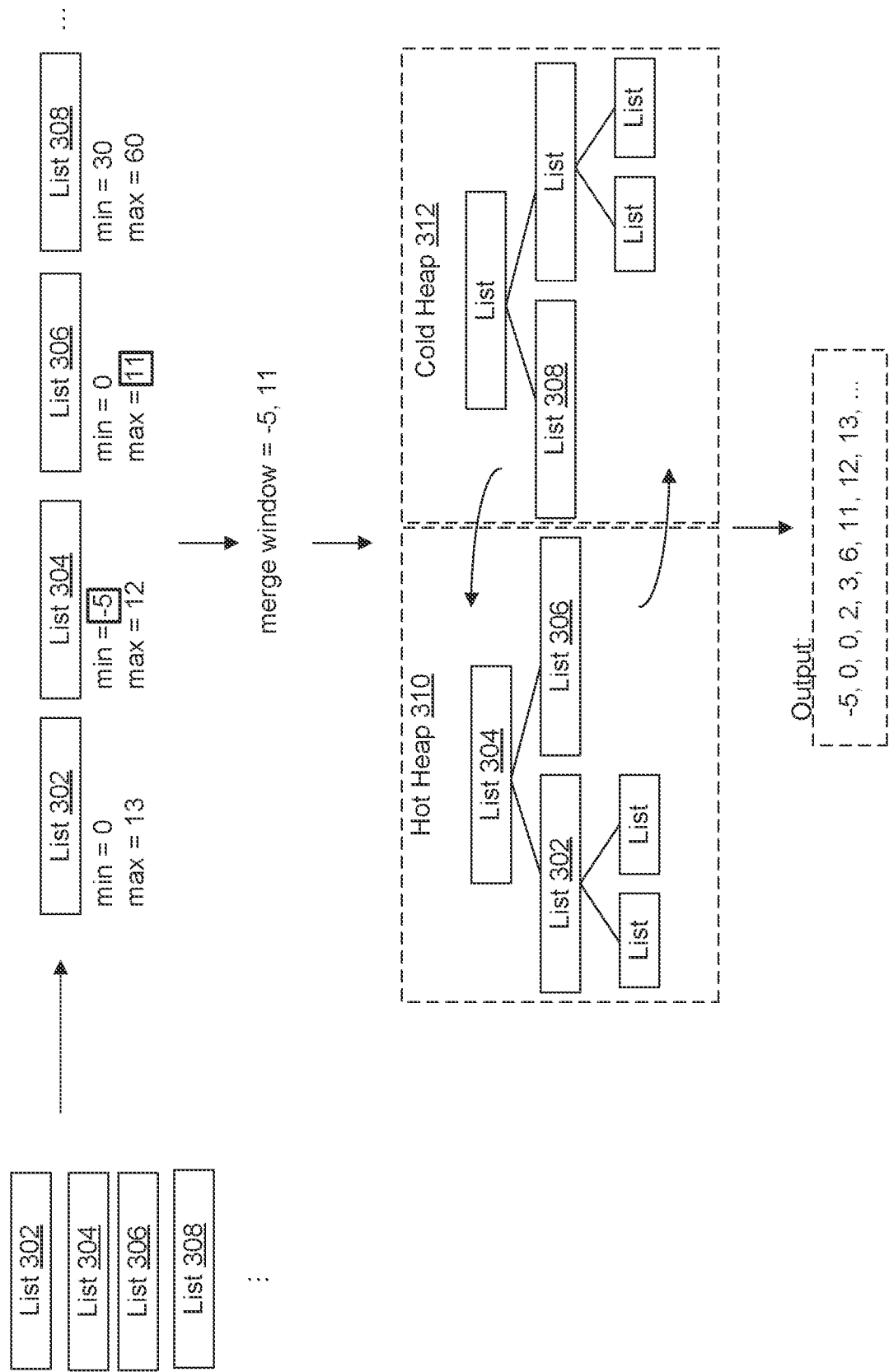
FIG. 3 shows a diagram that illustrates an example ordered scan of elements from multiple lists according to an example embodiment of the introduced technique.

FIG. 3 shows a diagram that illustrates, at a high level, an example ordered scan of elements from multiple lists, according to an example embodiment of the introduced technique. Other embodiments are described in greater detail later. As shown in FIG. 3, multiple lists 302, 304, 306, 308, etc., are processed to produce a sorted output. As with the existing approaches described with respect to FIGS. 1-2, each of the multiple lists 302, 304, 306, 308, etc., include a set of elements (e.g., keys). The example embodiment of the introduced technique begins by defining an initial merge window. In some embodiments, the merge window is defined based on the bounds of the lists to be sorted. For example, in certain embodiments, a minimum and maximum possible element for each list is known or can be determined. These minimum and maximum elements of each list define the initial bounds of each list and can be used to define the bounds of the merge window. For example, as shown in FIG. 3, the merge window is defined as "−5, 11" meaning that the merge window starts at "−5" and ends at "11." The start of the merge window may be based, for example, on the smallest minimum (or lower bound) in the set of lists 302, 304, 306, 308, etc. (i.e., "−5" in list 304). The end of the merge window can be based, for example, on the smallest maximum (or upper bound) in a list that includes a minimum (or lower bound) that is less than or equal to the maximum (or upper bound) in the list that includes the lowest minimum (e.g., "11" in list 306). In another embodiment, the end of the merge window may instead be defined as the maximum (or upper bound) in the list that includes the smallest minimum (or lower bound) (e.g., "12" in list 304). Note, these are just example rules for defining the merge window and may differ in other embodiments.

Using the merge window, the set of multiple lists 302, 304, 306, 308, etc., can be bifurcated into at least two groups based on whether they overlap the merge window or not. For example, a first group of lists that overlap the merge window (e.g., including lists 302, 304, 306, and other lists not show) are placed in a first min-heap (referred to in FIG. 3 as hot heap 310) and ordered based on their respective lower bounds (i.e., minimums). All other lists (e.g., list 308 and other lists not shown) are placed into a second min-heap (referred to in FIG. 3 as cold heap 312) and ordered based on their respective lower bounds (i.e., minimums). In this case, the hot heap 310 is an active heap where a merge is performed. Conversely, the cold heap 312 is an inactive heap storing lists that are not part of the active merge at any given time.

Notably, the dimensions (i.e., start and end) of the merge window will change over time as the merge process progresses. This means that as the merge progresses, lists may iteratively move between the hot heap 310 and cold heap 312 as they move in and out of the merge window. In some embodiments, the introduced technique may implement a third heap (not shown in FIG. 3) to assist in determining when to move lists between the first two heaps. This third heap may store entries corresponding to upper bounds of the lists in hot heap 310. An example embodiment of the introduced technique that uses three heaps is described in more detail with respect to FIG. 11.

The introduced technique for merging multiple lists into a sorted output represents an improvement in computer technology, particularly in the area of computer systems for storing and querying data. By placing lists of elements into multiple heaps based on a merge window, the introduced technique can, for example, reduce the number of element comparisons, reduce the number of elements that must remain in memory, and reduce the number of output operations. In certain situations, use of the introduced technique can result in significant reductions in overall memory utilization and processing latency when compared to existing approaches.

The benchmark figures below illustrate how applying the introduced multi-heap technique can significantly improve processing performance over existing approaches in certain scenarios. Specifically, the table below shows measured processing times (in seconds) for four different inputs using 1) an existing naïve ordered scan (e.g., as described with respect to FIG. 1), 2) an existing single-heap ordered scan (e.g., as described with respect to FIG. 2), 3) an embodiment of the introduced technique involving a double-heap ordered scan (e.g., as described with respect to FIG. 3), and 4) an embodiment of the introduced technique involving a triple-heap ordered scan (e.g., as described with respect to FIG. 11). The inputs tested include 1) a set of 1000 lists of keys half of which have overlapping keyspaces, 2) a set of 1000 lists with non-overlapping keyspaces, 3) a set of 1000 lists with overlapping keyspaces, and 4) a representative "real" 40 GB tablet of cell phone carrier data.

TABLE 1

| Input | Naïve (existing) | Single-heap (existing) | Double-heap (new) | Triple-heap (new) |
|---|---|---|---|---|
| 1000 lists, half-overlapping | 45.8 s | 11.0 s | 3.7 s | 3.5 s |
| 1000 lists, non-overlapping | 44.4 s | 11.0 s | 2.8 s | 2.8 s |
| 1000 lists, overlapping | 80.1 s | 9.6 s | 9.6 s | 9.6 s |
| Real (40 GB tablet) | 109976.4 s | 30513.4 s | 7987.1 s | 7155.6 s |

Distributed Computing System

In some embodiments, the introduced technique for merging multiple lists into a sorted output can be implemented in a distributed computing (e.g., data processing and storage) system. For example, certain embodiments of the introduced technique are described in the context of Apache Kudu™, which is a distributed computing engine for structured data that can be implemented in a distributed computing system architecture based, for example, on Apache Hadoop™. While the introduced technique is described in the context of Apache Kudu™ for illustrative purposes, a person having ordinary skill in the art will recognize that the technique is not limited to this context. Other embodiments of the introduced technique may be applied in other types of systems with similar traits for storing and querying data. For example, in some embodiments, the introduced technique may be applied in a distributed computing system that includes a distributed file system (DFS) such as Apache Hadoop Distributed File System (HDFS)™ and a DFS-based datastore such as Apache HBase™.

Apache Kudu™ stores data according to a columnar layout and distributes data using horizontal partitioning. In Apache Kudu™, each table may include its own distinct schema which defines its columns as well as the table's primary key. Data is organized into rows, with each row belonging to a particular table, and including a primary key that is unique within the table.

In Apache Kudu™, as in a log-structured merge tree, data is temporarily stored (e.g., buffered) in memory and a log is maintained to specify the disk location(s) where the data is to be written. This buffered data is flushed to the disk at a later time. Thus, there is a delay between the time when data comes in and when that data gets written onto the disk. This is typically because magnetic spinning disks are slow for random access operations. However, if data can be held temporarily in memory and then flushed out to a disk, then sequential write operations can be performed on the disk. Because sequential write operations are faster than random write operations, this results in faster write operations.

As new data comes in, such data first enters a memory buffer referred to as MemRowSet, which is similar to an in-memory cache. Data in the buffer later spills to the disk in smaller sorted files in a memory flush process. Thus, the data is typically sorted in memory, and then flushed on to the disk in smaller sorted files according to a memory flush process. In some embodiments, (e.g., in Apache Kudu™) the data is flushed into column files (CFiles) that are stored at a local filesystem (e.g., Linux™ filesystem) at one or more of the nodes of a distributed computing system. In other embodiments (e.g., in Apache HBase™), data are stored in sorted string tables (SSTables) or Hfiles. In some embodiments, the files stored at the nodes in the distributed computing system may include multiple "tablets." These tablets are each portions of a much larger data table that is stored in the distributed computing system. In other words, each tablet may represent a logical partition of the table's overall row space.

Figure 4:
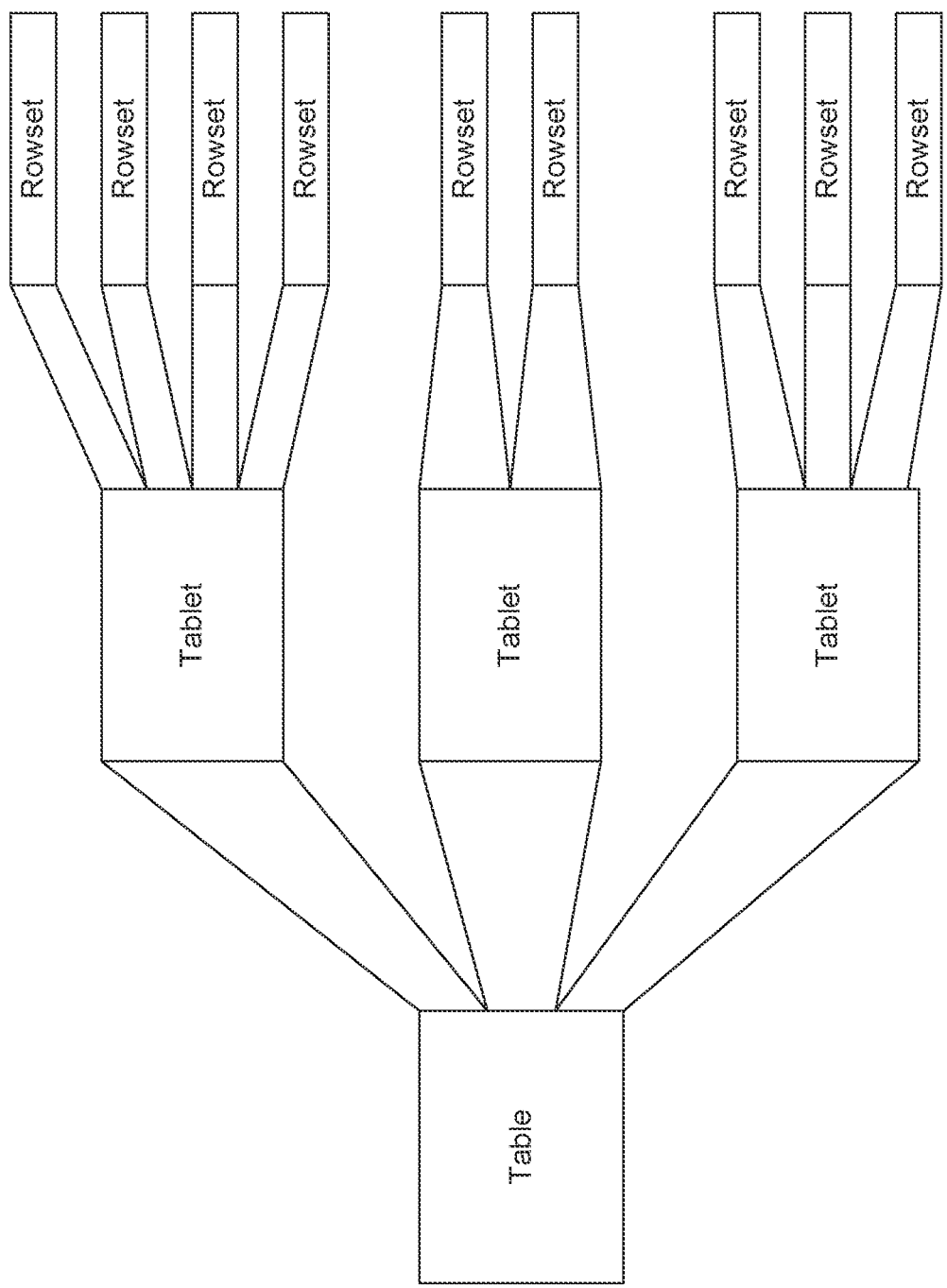
FIG. 4 shows a diagram of a table including multiple tablets, each of the multiple tablets including multiple rowsets.

Tablets can be subdivided into smaller units called rowsets. Some rowsets exist in memory only (i.e., MemRowSets), while others exist in a combination of disk and memory, termed DiskRowSets. According to disclosed embodiments, rowsets are disjoint with respect to a stored key, so any given key is present in at most one rowset. Although rowsets are disjoint, the primary key intervals of different rowsets can intersect or overlap. During a flush operation, a previous MemRowSet is written to disk, and becomes one or more DiskRowSets. This flush process is fully concurrent. In other words, readers can continue to access the old MemRowSet while it is being flushed, and updates and deletes of rows in the flushing MemRowSet are carefully tracked and rolled forward into the on-disk data upon completion of the flush process. FIG. 4 shows a diagram that illustrates the relationship between "tables," "tablets," and "rowsets," as used herein.

Figure 5:
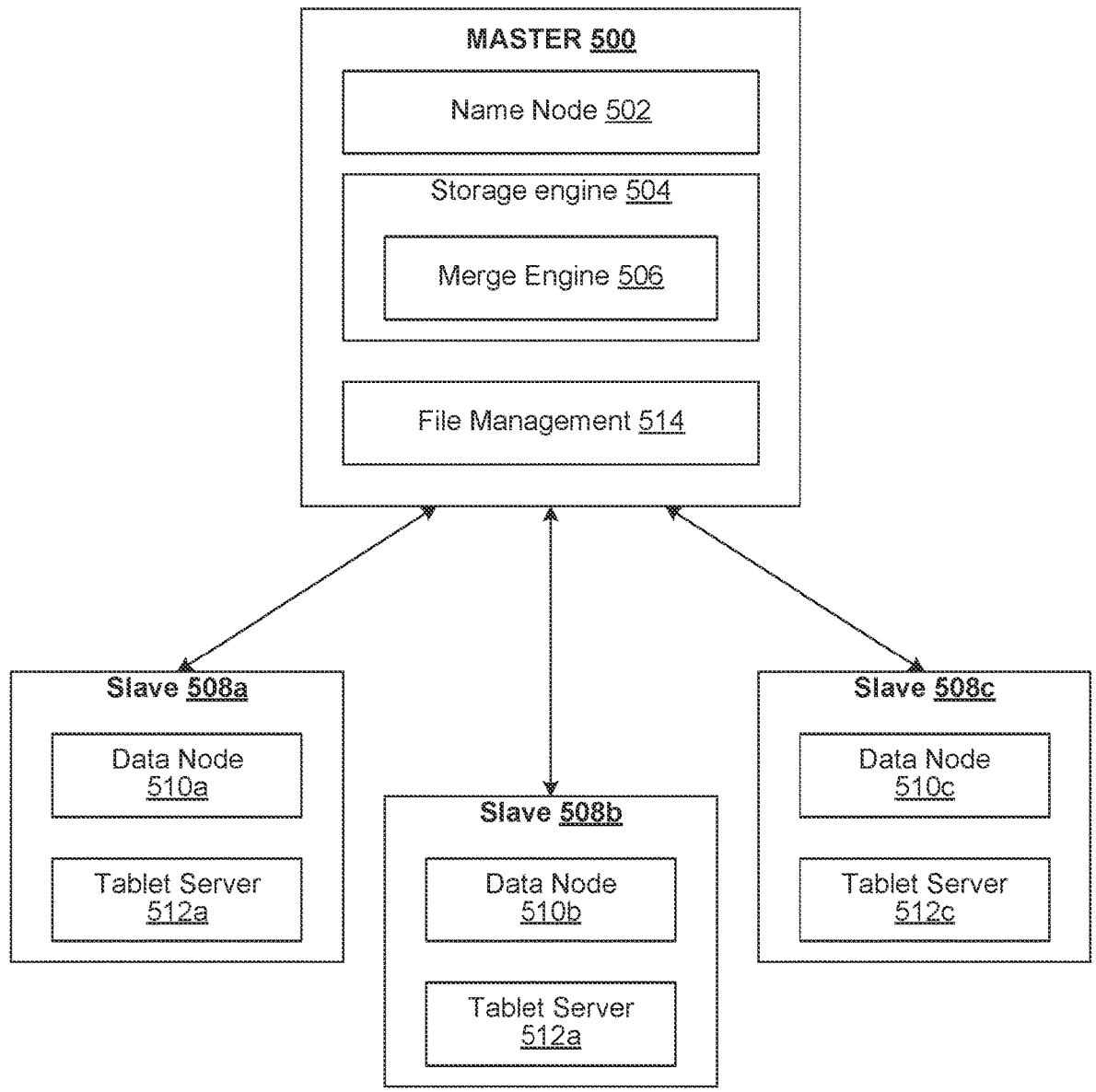
FIG. 5 shows a diagram that illustrates an example distributed computing system in which the introduced technique can be implemented.

FIG. 5 illustrates an exemplary distributed computing system in which the introduced technique can be implemented. In the illustrated environment, a distributed database (datastore) is provided. The datastore can also be referred to as a cluster having a master node 500 and one or more slave nodes 508a, 508b, and 508c. The master node 500 may be implemented on one or more servers and may include file management software 514 and a distributed computing engine (e.g., Apache Kudu™) master 504. In some embodiments, the distributed computing engine master 504 may include a merge engine that is configured to apply the introduced technique for merging multiple lists (e.g., rowsets) into a single sorted output. A slave node 508a, for example, may include a data node 410a and a tablet server 512a instance. Similarly, the other slave nodes 508b and 508c may include corresponding data nodes 510b and 510c (respectively) and corresponding tablet server 512b and 512c instances.

In some embodiments, the datastore shown in FIG. 5, may be deployed over a cloud-based platform via a cloud-based service provider, which may offer storage and/or other services remotely. In general, the cloud-based service provider hosts a cloud-based platform which enables clients to simultaneously access stored data remotely in real-time or near real-time. Users may additionally add, update, delete, or otherwise modify the data stored in the cloud-based platform. The cloud-based service provider may implement an architecture suited for handling the large volume of user requests through the cloud-based platform. Accordingly, lowering I/O accesses and reducing storage on associated databases provides a more efficient system.

In some embodiments, the computing devices (real or virtual) implementing the elements depicted in FIG. 5 may be communicatively coupled via one or more computer networks. For example, the slave nodes 508a-c may communicate with the master node 500 via one or more computer networks. The one or more computer networks can include, for example, a wired or wireless local area network (LAN), a wired or wireless wide area network (WAN), a cellular data network, or any combination or variation thereof. Further, the one or more networks can include open networks (e.g., the Internet), private networks (e.g., an intranet and/or extranet), or any combination or variation thereof. The network can be any collection of distinct networks operating wholly or partially in conjunction to provide connectivity to the distributed computing system and may appear as one or more networks to the serviced systems and devices. In one embodiment, communications can be achieved by a secure communications protocol, such as secure sockets layer (SSL) or transport layer security (TLS).

A data node 510a, for example, can include one or more tablets, which are portions of a large distributed table managed by the distributed computing engine master 504 at the master node 500. The distributed computing engine master 504 performs several functions. In some embodiments, the distributed computing engine master 504 can act as a catalog manager to keep track of which tables and tablets exist in the distributed computing system as well as the respective schema, replications, and other metadata associated with those tables/tablets. For example, the distributed computing engine master 504 can coordinate operations to create, alter, and/or delete data across the multiple tablets associated with a table. In some embodiments, the distributed computing engine master 504 can act as a cluster coordinator to keep track of which tablet servers 512A-C are alive and coordinate redistribution of data in the event of failures. In some embodiments, the distributed computing engine master 504 can act as a tablet directory to keep track of which tablet servers 512a-c are hosting replicas of each tablet in a table.

Figure 6:
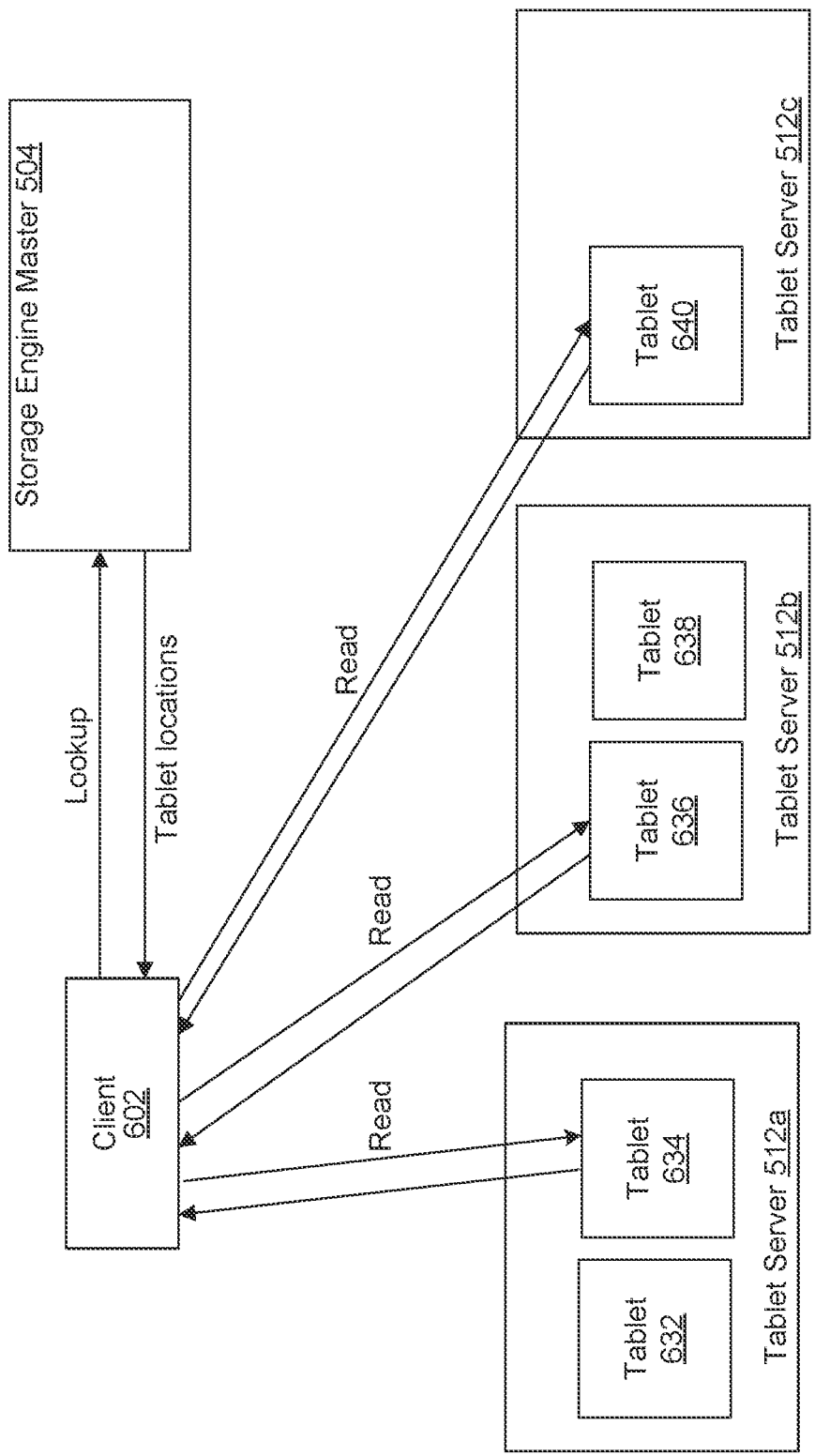
FIG. 6 shows a diagram that illustrates communication between a client and a distributed computing engine master to read data from a table stored in the distributed computing system of FIG. 5.

FIG. 6 shows a diagram illustrating communication between a client 602 and a distributed computing engine master 504 to read data from a table stored in the distributed system of FIG. 5, for example, as part of a query. In some embodiments, the client 602 may include a Java Database Connectivity (JDBC) client, Open Database Connectivity (ODBC) client, and the like that provides an application programming interface (API) and other tools for connecting and/or accessing a distributed computing cluster. As shown in FIG. 6, the client 602 may transmit a lookup request to the distributed computing engine master 504, which in turn responds with the locations of one or more tablets 632, 634, 636, 638, and 640 hosted by the multiple tablet servers 512a-c. The client 602 can then communicate with the appropriate tablet server 512a-c, using the returned tablet locations, to read data from the table.

FIG. 7 illustrates an example database table 700 that may be stored, for example, in the distributed computing system of FIG. 5. For example, table 700 may be one of multiple tables stored in the distributed computing system of FIG. 5 and managed using a distributed computing engine such as Apache Kudu™. For illustrative purposes, the example table 700 is depicted in FIG. 7 as storing information related to tweets (i.e., messages sent using Twitter™, a social networking service); however, such tables are not limited to storing such information.

Table 700 includes horizontal partitions 702 ("Tablet 1"), 704 ("Tablet 2"), 706 ("Tablet 3"), and 708 ("Tablet 4") hosting contiguous rows that are arranged in a columnar layout. A distrusted storage system (e.g., as depicted in FIG. 5) may have any number of database tables, each of which has a well-defined schema including a finite number of columns. Each such column includes a primary key, name, and data type (e.g., INT32 or STRING). Columns that are not part of the primary key may optionally be null columns. Each tablet in table 700 includes columns 750 ("tweet_id"), 752 ("user_name"), 754 ("created_at"), and 756 ("text"). The primary keys (denoted "PK" in Table 700) each correspond to a "tweet_id" which is represented in INT64 (64-bit integer) format. As previously mentioned, as evidenced in FIG. 7, a primary key within each tablet is unique within each tablet. Furthermore, a primary key within a tablet is exclusive to that tablet and does not overlap with a primary key in another tablet. Thus, in some embodiments, the primary key enforces a uniqueness constraint (at most one row may have a given primary key tuple) and acts as the sole index by which rows may be efficiently updated or deleted.

Together, the keys stored across all the tablets in a table cumulatively represent the database table's entire key space. For example, the key space of table 700 spans the interval from 1 to 3999, each key in the interval represented as INT64 integers. Although the example in FIG. 7 illustrates INT64, STRING, and TIMESTAMP (INT 64) data types as part of the schema, in some embodiments a schema can include one or more of the following data types: FLOAT, BINARY, DOUBLE, INT8, INT16, and INT32.

After creation, a table can be mutated, for example, by using Re-Insert (re-insert operation), Update (update operation), Delete (delete operation) Application Programming Interfaces (APIs). Collectively, these can be termed as "Write" operations. Data in the table can be accessed using "Read," equivalently, "Scan" operations. Examples of Read operations include comparisons between a column and a constant value, and composite primary key ranges, among other Read options.

Figures 8A, 8B:
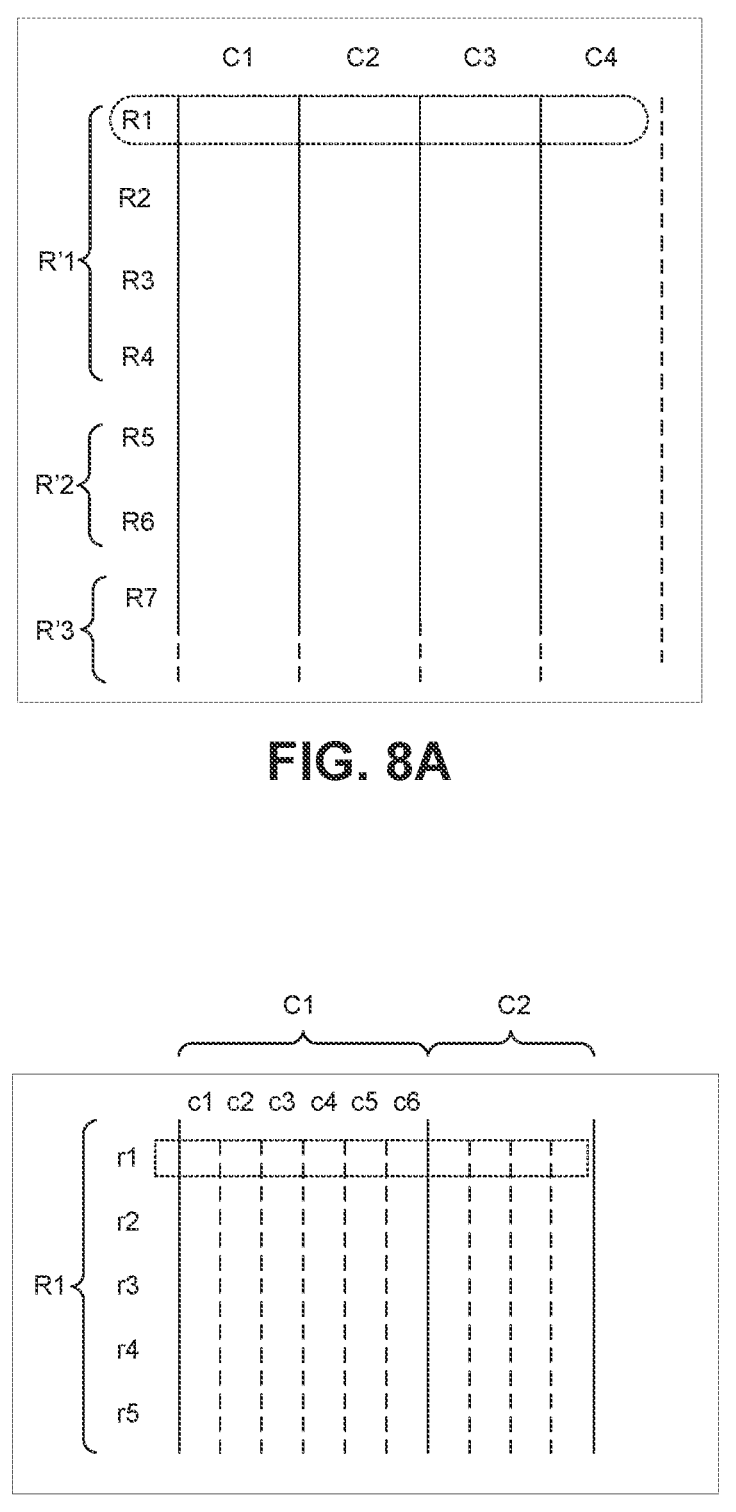

FIGS. 8A and 8B show snapshots of an example table that further illustrate an example structure of a table in a distributed computing system. For purposes of this description, DiskRowSets in the table are represented as "R'," rowsets included within a DiskRowSet stored on a tablet are represented as "R," and rows included within a rowset are represented as "r." As shown, each DiskRowSet, e.g., represented as DiskRowSets R'1, R'2, R'3, etc., can include multiple rowsets stored within a particular row and column in the table. Thus, DiskRowSet R'1 includes rowsets R1, R2, R3, and R4. DiskRowSet R'2 includes rows R5 and R6. Each rowset can include multiple rows. For example, rowset R1 includes rows r1, r2, r3, r4, and r5, as shown in FIG. 8B. (Note: a DiskRowSet is a type of rowset, thus every DiskRowSet may also be referred to as a rowset.)

This method of encapsulation of data allows, for example, DiskRowSet R'1 to be stored on a first tablet, and DiskRowSet R'2 to be stored on a second tablet. These tablets can, in turn, be managed by several tablet servers running on the data nodes of a cluster. For example, a tablet server 512a at slave node 508a of FIG. 5 can manage files in DiskRowSet R'1 and any addenda, and tablet server 512b at slave node 508b of FIG. 5 can manage files in DiskRowSet R'2 and any addenda, and so on. Each DiskRowSet, e.g., R'1, R'2, R'3 can be individually sorted, but they may not necessarily be sorted with respect to one another.

Figure 9:
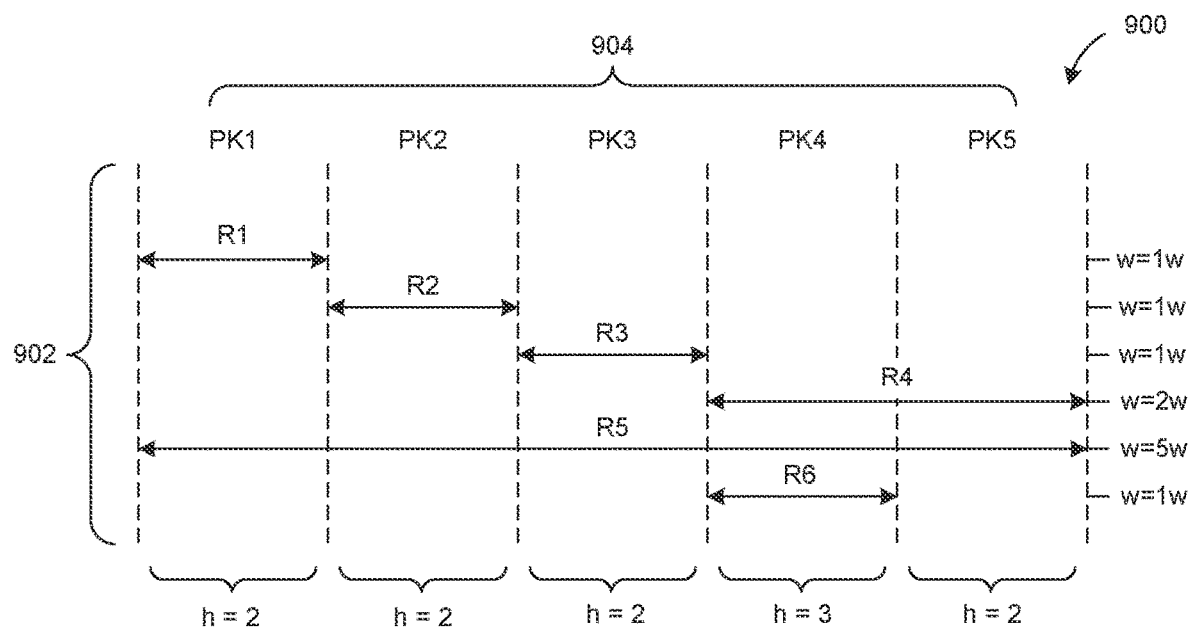
FIG. 9 shows a diagram that illustrates multiple rowsets of variable size with overlapping keyspaces.

FIG. 9 shows a diagram that illustrates multiple rowsets 902 of variable size in multiple tablet keyspaces 904 on, for example, a data node that includes a tablet 900. As illustrated in FIG. 9, rowsets 902, e.g., rowsets R1-R6, may be stored in a tablet. Each rowset R1-R6 is depicted in FIG. 9 as an interval occupying one or more tablet keyspaces 904, based on the first and the last key of each respective rowset. This interval based on the first and last (e.g., minimum and maximum) key for a given rowset may be referred to herein as a rowset keyspace. The tablet keyspaces each span horizontally (e.g., x-axis) and may also be referred to by their primary sort key, represented as "PK." In other words, a tablet keyspace refers to a keyspace within which rows associated with a particular primary key reside. The multiple tablet keyspaces PK1-PK5 may comprise an overall tablet keyspace associated with tablet 900 that refers to a keyspace within which all associated rows reside. In the depicted example, rowset R1 occupies tablet keyspace PK1, while rowset R5 occupies tablet keyspaces PK1-PK5. Thus, in this example, rowset R1 overlaps in range with rowset R5.

The width of a rowset can be proportional to the percentage of a tablet keyspace that it spans. For example, the tablet 900 includes five tablet keyspaces PK1-PK5. If each tablet keyspace is assumed to be equal to "w," then rowset R1 has width 1w, rowset R2 has width 1w, R3 has width 1w, R4 has width 2w, R5 has width 5w, and R6 has width 1w. In numerical terms, for example, each width ("w") can represent, for example, 0.2 or 20% of the overall tablet keyspace spanned in the tablet 900. This width can be used to represent the probability that any read (or other operation) in a uniform random read workload will have to consult a particular rowset.

The height of a particular primary key can be defined as the number of rowsets that have overlapping key ranges. For example, PK1 has a height of "2," because rowsets R1 and R5 overlap in PK1. PK2 has a height of "2," because rowsets R2 and R5 overlap in PK2. Also, PK3 has a height of "2," PK4 has a height of "3," and PK5 has a height of "2." The height of a particular primary key can be used to represent the number of rowsets that will have to be consulted for a random read of that key. Thus, in FIG. 9, the height of the tablet ranges between two and three.

Figure 10:
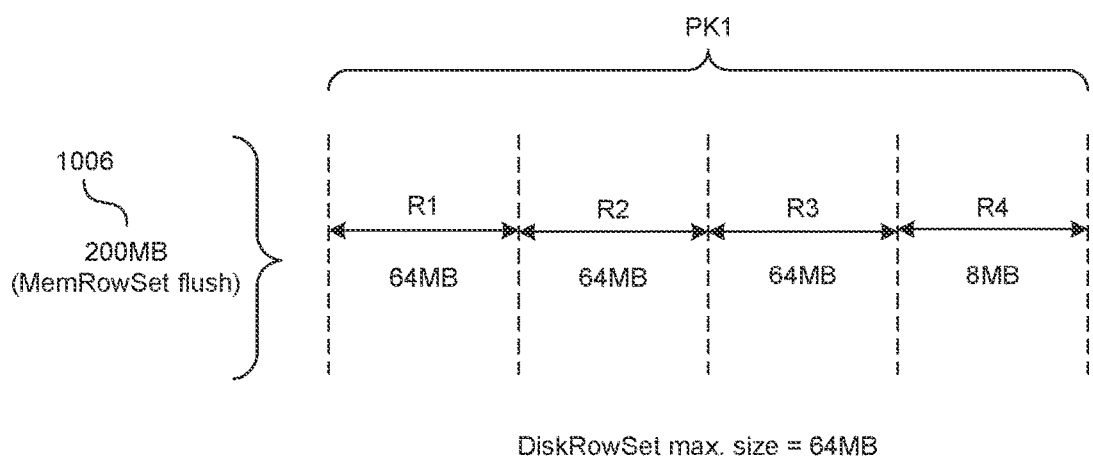
FIG. 10 shows a diagram that illustrates multiple rowsets of bounded size stored in multiple keyspaces.

FIG. 10 shows a diagram that illustrates multiple rowsets of bounded size stored in multiple tablet keyspaces. In order for the system to limit a size of a rowset within predefined bounds, the DiskRowSet writer code may be modified to roll over to a new rowset once a threshold (e.g., upper bound) rowset size is met. In the example illustrated in FIG. 10, the maximum rowset size is 64 MB, e.g., DiskRowSet max=64 MB.

When the new dataset stored in the MemRowSet 506 buffer is flushed to disk, this data is then distributed to a tablet keyspace, e.g., PK1, within the predefined bounds of DiskRowSet. For example, given a 200 MB data flush from MemRowSet, R1 is 64 MB, R2 is 64 MB, R3 is 64 MB, and R4 is the remaining 8 MB. In some embodiments, the system may estimate the on-disk data size such that each rowset receives equal or approximately equal data sizes during the flush.

After several MemRowSet flushes, tablet keyspaces may include various rowsets with small files spanning the entirety of the tablet keyspace because these bounds cause roll over rowsets of lesser length. For example, in FIG. 10, R4 includes only 8 MB of the 64 MB maximum. These small sized rowsets may occur, for example, in a uniform random insert load.

After several MemRowSet flushes, various smaller sized rowsets may be overlapping within a particular tablet keyspace. For example, with respect to FIG. 10, PK1 may additionally include rowset R5 (22 MB) and rowset R6 (8 MB). Rowset R5 and R6 can both overlap with rowset R4, causing the depth of the PK1 to be three which, in turn, causes the average rowset depth in that tablet keyspace to be three. Thus, each access to the tablet may require a query to each of the rowsets in that tablet keyspace. In some cases, certain rowsets may be compacted, for example, using the introduced merging technique, to output a new Rowset. For example, overlapping rowsets R4, R5, and R6 may be compacted, for example, using the introduced merging technique, to output a single, non-overlapping rowset R7.

Performing an Ordered Scan in a Distributed Computing System

In some embodiments the introduced technique for merging multiple lists of elements into a single sorted output can be applied to perform ordered scans in a distributed computing system, for example, as described with respect to FIG. 5. For example, in Apache Kudu™, the multiple "lists" to be merged can correspond to multiple per-rowset iterators with sorting performed based on an ordering of the primary keys associated with each rowset. In other words, an ordered scan can be performed using multiple per-rowset iterators to produce a sorted output (ordered based on the primary keys) using the introduced technique (an embodiment of which is described with respect to FIG. 3).

Further, Apache Kudu™ is configured in such a way that can lead to additional optimization when using the introduced technique for performing ordered scans. For example, in Apache Kudu™, each rowset's smallest and largest possible primary keys (i.e., bounds) are known ahead of time without any need to peek the data in the rowset. This is because each rowset's bounds are predefined by a distributed computing engine (e.g., Apache Kudu™) that manages the table associated with the rowsets. Further, when iterating on rowsets in Apache Kudu™, peeking even one row means decoding a page of columnar data for each projected column. This decoded data remains resident in memory, which means that there is an opportunity to significantly optimize performance (e.g., reduce memory consumption) by minimizing the set of peeked iterators. Still further, there is little reason not to peek more than one row at a time since the predominant source or memory usage occurs due to the decoded pages rather than buffered rows.

The introduced technique for performing ordered scans can be applied to various different processes associated with a distributed computing system. The following are some example use cases in which the introduced technique performing ordered scans can be applied in a distrusted storage system. The following example use cases are provided for illustrative purposes; however, the introduced technique is not limited to such applications.

In some embodiments, the introduced technique for performing ordered scans can be applied to return a list of ordered elements to a client in response to a query received from the client. For example, a query received from a client may request an ordered list of data elements that are distributed across multiple tablets in a distributed computing system.

In some embodiments, the introduced technique for performing ordered scans can be applied to enable fault tolerance in a distributed computing system. For example, to enable fault tolerance, a scan requires ordering among elements so that the scan can be properly resumed if, for example, a node executing the scan fails.

In some embodiments, the introduced technique for performing ordered scans can be applied to increase data storage efficiency through a process known as "compaction." Compaction generally refers to a process of combining multiple smaller partitions of data into fewer larger partitions. In the context of Apache Kudu™, compaction can be applied to merge multiple rowsets (in some cases with overlapping rowset keyspaces) into a single larger rowset that is ordered based on the primary keys of the multiple rowsets. Since the keys in the multiple rowsets may not be ordered relative to each other, the introduced technique can be applied to generate a compacted rowset with an ordered set of keys.

In some embodiments, the introduced technique for performing ordered scans can be applied to perform incremental backup in a distributed computing system. An incremental backup is one that builds on a previous backup and instead includes only a delta based on data that has changed since the previous backup. The introduced technique for performing an ordered scan can be applied to help identify what has changed since a previous backup. For example, in Apache Kudu™, the incremental backup may result in multiple rows that share the same primary key. Each of these rows sharing the same primary key may represent different versions of the same row of data at different points in time. One of the multiple rows is a current "live" row and others are "dead" rows representing older versions of the live row. A traditional unordered scan would just discount any dead rows meaning that they would not show up in the results. However, a system implementing incremental backup may care about the multiple different versions of the row. In an ordered scan, for example, performed using the introduced technique, the multiple same primary keys will appear in a set of results one after another which allows the system to detect that they represent different versions of the same row and to determine which reference the live row and which reference dead rows.

For illustrative simplicity, the introduced technique for performing ordered scans is described herein in the context of merging per-rowset iterators corresponding to rowsets of one or more tablets of data, for example, as in Apache Kudu™; however, this is not intended to be limiting. The introduced technique for merging multiple lists of data into a single sorted output can be applied in any other type of distributed computing context including non-columnar data stores. For example, in a distributed computing system, the multiple "lists" to be merged can more generally correspond with multiple partitions a larger dataset that is distributed across multiple nodes of the distributed computing system. In such an embodiment, each list includes one or more ordinal elements (e.g., keys or other sortable data) and each of the multiple ordinal elements of the overall dataset may be part of one of the multiple lists comprising the dataset. In other words, an ordered scan can be performed on a dataset that is partitioned into multiple lists of ordinal elements to produce a sorted output (i.e., including ordinal elements from two or more of the lists) using the introduced technique (an embodiment of which is described with respect to FIG. 3).

Figure 11:
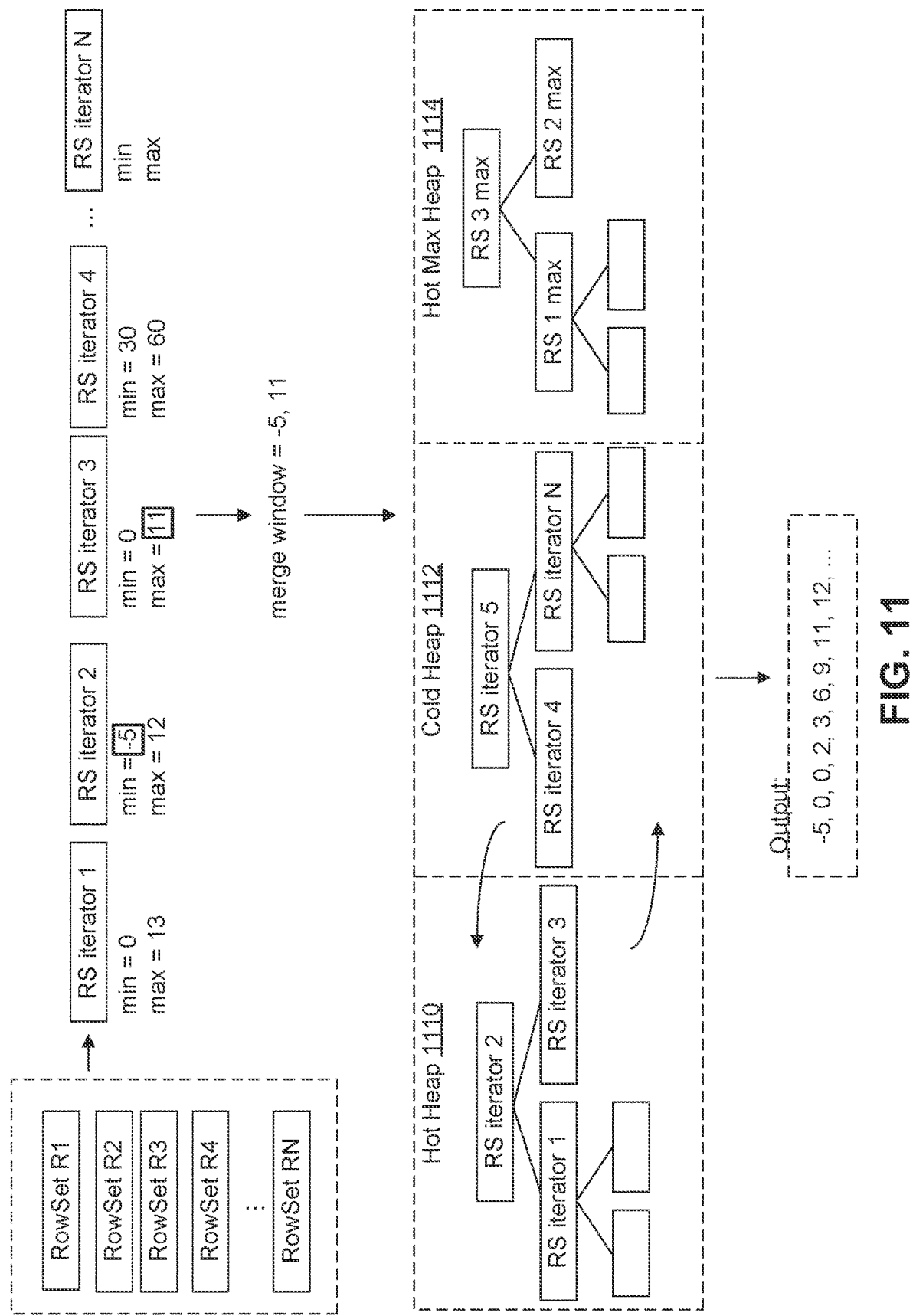
FIG. 11 shows a diagram that illustrates an example process for performing an ordered scan on a table that is horizontally partitioned into multiple rowsets, according to an embodiment of the introduced technique.

FIG. 11 shows a diagram illustrating an example process for performing an ordered scan on a table (e.g., in Apache Kudu™) according to an embodiment of the introduced technique. As shown in FIG. 11, the process is performed on a table that includes multiple rowsets R1, R2, R3, R4, . . . RN. The multiple rowsets R1-RN may represent some or all of the rowsets in the table. For example, in some embodiments, the multiple rowsets R1-RN may include rows that satisfy one or more query conditions received from a client (e.g., client 602 in FIG. 6). In some embodiments, the multiple rowsets R1-RN may be part of one of the multiple tablets of the table. For example, rowsets R1-RN may all be part of a first tablet. In other embodiments, each of the multiple rowsets R1-RN may be part of one of multiple different tablets. For example, rowsets R1-R2 may be part of a first tablet, rowset R3 may be part of a second tablet, rowset R4 may be part of a third tablet, etc. The process depicted in FIG. 11 is performed using multiple per-rowset iterators, each corresponding to a particular rowset of the table. For example, rowset 1 corresponds to RS iterator 1, rowset 2 corresponds to RS iterator 2, rowset 3 corresponds to RS iterator 3, rowset 4 corresponds to RS iterator 4, etc.

Each per-rowset iterator can be conceptualized as a sequence of discrete row "runs" as opposed to a continuous sequence of single rows. Each "run" of a per-rowset iterator therefore has a lower bound (e.g., the key of the first row in the run) and an upper bound (e.g., the key of the last row in the run). Each "run" in a per-rowset iterator may include keys associated with all or some of the rows associated with the corresponding rowset. For example, the multiple keys in a run of a given per-rowset iterator may only correspond to those rows in rowset that satisfy one or more query conditions received from a client (e.g., client 602 in FIG. 6). As used herein, each run in each per-rowset iterator is designated as a "NEXT": its rows have been peeked and are resident in memory. Whenever elements (e.g., keys) are read from a per-rowset iterator, they can be read from the iterator's NEXT. In FIG. 11, the bounds of each per-rowset iterator are represented as a minimum and maximum key. For example, as shown in FIG. 11, RS iterator 1 has a lower bound (i.e., minimum key) of "0" and upper bound (i.e., maximum key) of "13," RS iterator 2 has a lower bound of "−5" and upper bound of "10," RS iterator 3 has a lower bound of "0" and upper bound of "11," RS iterator 4 has a lower bound of "30" and upper bound of "60," etc.

The bounds of the per-rowset iterators can be used to establish overlapping relationships between rows across multiple per-rowset iterators and can therefore be used to define a merge window, for example as discussed with respect to FIG. 3. At any given time, the merge widow describes a keyspace interval where the row with the smallest key is expected to be found.

In other words, the merge window is defined based on the bounds of the multiple per-rowset iterators. In an example embodiment (e.g., as depicted in FIG. 11), the start of the merge window is, or is based on, the smallest lower bound of all of the multiple per-rowset iterators. For example, as depicted in FIG. 11, RS iterator 2 has the smallest lower bound ("−5"). This iterator with the smallest lower bound is designated as LOW. In other words, at the initial state of the scenario depicted in FIG. 11, RS iterator 2 is the LOW; however, this can change as the merge process progresses and keys are popped from the one or more per-rowset iterators.

In an example embodiment, the end of the merge window can be, or be based on, the smallest upper bound of all of the per-rowset iterators R1-RN that have a lower bound that is less than or equal to the LOW's upper bound. For example, as depicted in FIG. 11, all three of RS iterator 1, RS iterator 2, and RS iterator 3 have lower bounds ("0," "−5," and "0," respectively) that are less than or equal to the LOW's upper bound ("12"). Note, RS iterator 4's lower bound ("30") is not less than or equal to the LOW's upper bound ("12"). However, RS iterator 3 has the smallest upper bound ("11") when compared to the upper bounds of the RS iterator 1 and RS iterator 2 ("13" and "12," respectively). Accordingly, the end of the merge window, in this instance, is the upper bound of RS iterator 3 (i.e., "11"). The merge window's end could be the LOW's upper bound if that upper bound is the smallest; however, that is not the case in the example depicted in FIG. 11. Further, the bounds of the merge window depicted in FIG. 11 (i.e., "−5, 11") just represent an initial state of the merge window before the merge process has started. As previously discussed, the merge window's dimensions will change (i.e., update) as the merge progresses and keys are popped from the one or more per-rowset iterators to produce the sorted output. That being said, using the merge window definition described above, the merge window will always move "to the right" (i.e., the start and end of the merge window will only ever increase) as the merge progresses.

The aforementioned description of how to define a merge window is only an illustrative example and is not to be construed as limiting. Other embodiments may define the merge window differently. For example, in an alterative embodiment, the merge window may be defined based on a specified "distance" (e.g., a set value or a percentage of an overall keyspace) from the start. In such an embodiment, the initial merge window for the scenario depicted in FIG. 11 would be set at "−5, 15" using an example specified distance of "20" from the start of the merge window (i.e., "−5"). In another alternative embodiment, the merge window may be set based only on the upper and lower bounds of the LOW. In such an embodiment, the initial merge window for the scenario depicted in FIG. 11 would be set at "−5, 12" representing the lower and upper bounds of the initial LOW (i.e., RS iterator 2). In some embodiments, rules for defining the merge window are set and remain static in a distributed computing engine implementing the introduced technique. In other embodiments, the rules for defining the merge window may dynamically change during and/or between ordered scans, for example, in response to user inputs, characteristics of the ordered scan, conditional events, etc.

The set of multiple per-rowset iterators can then be split into at least two subsets based on the merge window. In an example embodiment, the multiple per-rowset iterators are bifurcated into two subsets, those with a NEXT that overlaps the merge window and those with a NEXT that does not overlap the merge window. Those iterators with a NEXT that overlaps the merge window are stored in a first min-heap designated as Hot Heap 1110, and those iterators with a NEXT that does not overlap with the merge window are stored in a second min-heap designated as Cold Heap 1112. For example, as shown in FIG. 11, RS iterator 1, RS iterator 2, and RS iterator 3 are initially stored in Hot Heap 1110 because their respective NEXTs overlap the merge window. Again, a NEXT refers to a run in each iterator with rows that have been peeked and that are resident in memory. Accordingly, the NEXT of each iterator has a lower bound (e.g., the key of the first row in the run) and an upper bound (e.g., the key of the last row in the run). For example, RS iterator 1's NEXT has bounds "0, 13," at least in the state depicted in FIG. 11. Accordingly, RS iterator 1's NEXT overlaps the associated state of the merge window which is "−5, 11." Conversely, RS iterator 4's NEXT does not overlap the merge window because the lower bound of the NEXT (i.e., "30") is greater than the upper bound of the merge window (i.e., "11").

The per-rowset iterators are stored in one of the at least two heaps and ordered based, for example, on the lower bound of their respective NEXT. For example, FIG. 11 depicts RS iterator 2 at the top of Hot Heap 1110, because it has a NEXT that overlaps the merge window and has a smaller lower bound (i.e., "−5") than any of the other iterators that also overlap the merge window (e.g., RS iterator 1 and RS iterator 3). Similarly, since RS iterator 5 is depicted in FIG. 11 at the top of the Cold Heap 1112, it is presumed that it's corresponding NEXT has a smaller lower bound than that of the other iterators that do not overlap the merge window, although the bounds of RS iterator 5 are not actually specified in FIG. 11. In other words, the iterator at the top of the Cold Heap 1112 will be closer to the merge window than other iterators below it in the Cold Heap 1112.

It should be noted that in some cases, bounds of a NEXT are not necessarily the same as the absolute bounds of the corresponding iterator. For example, as previously mentioned, in Apache Kudu™ each rowset's smallest and largest possible primary keys (i.e., bounds) are known ahead of time without any need to peek the data in the rows associated with the rowset. In other words, the absolute bounds of a corresponding per-rowset iterator are predefined by a distributed computing engine (e.g., Apache Kudu™) that manages the table associated with the rowsets. The bounds of the NEXT (i.e., the actual first and last keys) may differ from the absolute bounds of the per-rowset iterator. However, in some embodiments, the absolute bounds of the per-rowset iterator can used as stand-ins for the NEXT's upper and lower bounds for the purposes of ordering in the Hot Heap 1110 and Cold Heap 1112. Using the absolute bounds of the per-rowset iterator as stand-ins for the NEXT's upper and lower bounds has the advantage of deferring peeking for as long as possible, at least until a given iterator moves from the Cold Heap 1112 to the Hot Heap 1110.

At any given time during a merge process, the per-rowset iterators in Hot Heap 1110 can be conceptualized as participating in the merge process while the iterators in Cold Heap 1112 can be conceptualized as not participating in the merge process. In other words, during the merge process, a top-most iterator (e.g., RS iterator 2) is popped from the Hot Heap 1110, its lower bound (i.e., first key) is copied to the output and advanced, the iterator is pushed back into the Hot Heap 1110, the iterators of the Hot Heap 1110 are reordered (if necessary), and the process is repeated until the output is complete.

FIG. 12 shows a diagram illustrating a sequence of states of the Hot Heap 1110 of FIG. 11 during an example merge process. At state 1, Hot Heap 1110 appears as it does in FIG. 11 with RS iterator 2 at the top of the heap. Next, at state 2, the top-most iterator, in this case RS iterator 2, is popped from the Hot Heap 1110. As shown in FIG. 12, the NEXT 1202 of RS iterator 2 includes keys "−5, 2, 6, and 12." The lower bound (i.e., first non-exhausted key) is then copied into the output. In this context a key is "exhausted" if it has already been copied to the output. Therefore, non-exhausted keys include those keys that have not yet been copied to the output. In scenario depicted at state 2, the first non-exhausted key in NEXT 1202 is the first key "−5" (since no keys have yet been copied to the output). This first non-exhausted key is copied to the output to become the first key in the sorted output. The NEXT is then advanced such that the first key (i.e., "−5") is exhausted and the lower bound of the RS iterator 2 is updated to be the subsequent key in the corresponding rowset (i.e., "2"). At state 3, RS iterator 2 is placed back into Hot Heap 1110; however, as shown in FIG. 12, RS iterator 2 is no longer at the top of the heap. This is because the new lower bound of RS iterator 2 (i.e., key "2") is no longer the smallest lower bound of the iterators in the Hot Heap 1110. Recall from FIG. 11, that both RS iterator 1 and 3 have lower bounds of "0." Next at state 4, the top-most iterator in Hot Heap 1110 (now RS iterator 1) is again popped from the Hot Heap 1110. As shown in FIG. 12 the NEXT 1204 of RS iterator 1 includes keys "0, 3, 9, and 13." The lower bound (i.e., first key) is then copied into the output. In this case, the first key in NEXT 1203 is "0" and is copied to the output to become the second key in the sorted output. This iterative process continues until the output is complete.

Per-rowset iterators can move between the Hot Heap 1110 and Cold Heap 1112 during the merge process, since the lower bound of an iterator is advanced after copying the previous lower bound of an iterator to the output. For example, as previously mentioned, the merge process may progress in Hot Heap 1110 by popping RS iterator 2 (since it is at the top of the heap), copying the lower bound (i.e., "−5") to the output, and then advancing the lower bound to the next key in the run. RS iterator 2, with its new lower bound, is then placed back into Hot Heap 1110. Depending on the value of the new lower bound, RS iterator 2 may remain at the top of Hot Heap 1110 (as depicted in FIG. 11), move down in Hot Heap 1110 (as depicted in FIG. 12), or move to Cold Heap 1112. Recall that that the merge window which dictates whether an iterator is placed in the Hot Heap 1110 or Cold Heap 1112 is based in part on the lower bounds of the iterators.

In other words, the merge window may move when the lower bounds of the iterators advance, when an iterator is fully exhausted (i.e., all keys have been copied to the output), or when an iterator finishes its NEXT and needs to peek again. Further, the Hot-Heap 1110 may need to be updated when the merge window moves since that is a sign that the merge window may now overlap with a NEXT belonging to an iterator in the Cold-Heap 1112.

Accordingly, the introduced technique can include determining whether to move iterators between the Hot Heap 1110 and Cold Heap 1112. In some embodiments, this third heap is implemented to assist in this determination. Returning to FIG. 11, a Hot Max Heap 1114 is implemented that stores keys corresponding to the iterators present in the Hot Heap 1110 at any given time. More specifically, each entry in the Hot Max Heap 1114 corresponds to the last key (i.e., the upper bound) of the NEXTs belonging to the per-rowset iterators in the Hot Heap 1110. The entries in the Hot Max Heap 1114 are ordered as a min-heap. In other words, the top most entry in the Hot Max Heap 1114 is smaller than the entries below it. For example, as shown in FIG. 11, the top of Hot Max Heap 1114 is "RS 3 max" which corresponds to the smallest upper bound of the iterators in the Hot Heap 1110 (e.g., "11" in RS iterator 3). Since the end of the merge window in this example, is defined as the smallest upper bound of all iterators whose lower bounds are less than or equal to LOW's upper bound, this top entry in the Hot Max Heap 1114 corresponds to the end of the merge window at any given time.

When the end of the merge window moves, one or more of the iterators in the Cold Heap 1112 may be moved to the Hot Heap 1110 if they now overlap the merge window. Generally, the top-most iterator in the Cold Heap 1112 is the best candidate since the lower bound of that iterator's NEXT is closer to the previous end of the merge window. To determine whether the-top most iterator should be moved to the Hot Heap 1110, the lower bound of the iterator's NEXT is compared to the top-most key in the Hot Max Heap 1114. If the lower bound of the iterator's NEXT is less than or equal to the top-most key in the Hot Max Heap 1114, it means that the lower bound of the iterator's NEXT is less than or equal to the end of the merge window, which in turn means that the iterator's NEXT now overlaps the merge window. Accordingly, if the lower bound of the iterator's NEXT is less than or equal to the top-most key in the Hot Max Heap 1114, that iterator is moved from the Cold Heap 1112 to the Hot Heap 1110.

Conversely, one or more of the iterators in the Hot Heap 1110 may be moved to the Cold Heap 1112 if they no longer overlap the merge window. For example, when the NEXT of an iterator in the Hot Heap 1110 is advanced (i.e., after copying a previous next to the output), that NEXT may no longer overlap with the merge window. To determine whether such an iterator should be moved to the Cold Heap 1112, the lower bound of the iterator's NEXT is compared to the top-most key in the Hot Max Heap 1114. If the lower bound of the iterator's NEXT is greater than the top-most key in the Hot Max Heap 1114 it means that the lower bound of the iterator's NEXT is greater than the end of the merge window, which in turn means that the iterator's NEXT no longer overlaps the merge window. Accordingly, if the lower bound of the iterator's NEXT is greater than the top-most key in the Hot Max Heap 1114, that iterator is moved from the Hot Heap 1110 to the Hot Heap 1112. These steps of moving iterators between the Hot Heap 1110 and Cold Heap 1112 may be performed multiple times over the course of the merge operation until the merge is complete.

In some embodiments, the introduced technique may apply a "whole block copy" optimization whereby if there is only one per-rowset iterator in the merge window (i.e., only one per-rowset iterator in the Hot Heap 1110), the process can copy the entire block of keys (or a specified quantity of multiple keys) out of that iterator instead of copying row-by-row (referred to herein as a "rowblock"). Such an optimization can save both time and memory resources by copying blocks of data (e.g., a sequence of multiple keys) from an iterator instead of on a row-by-row basis as described, for example, with respect to FIG. 12.

When copying row-by-row, the merge iterator may skip deselected rows in order to always return the next smallest row. Merge iterator state bookkeeping may help to enforce this invariant. When copying block-by-block, skipping deselected rows may be harder (and potentially less performant) than a simple bitmap copy. Plus, it's not necessary for correctness; the scan endpoint will skip deselected rows when serializing the rowblock. To address proper handling of a client's selection vector, deselected rows can be retained in the block-by-block case. In some embodiments, the default rowblock sizes in various merge-related paths can be changed (e.g., to be a power of 2) which may help to increase the likelihood of hitting the bitmap copy "fast path" during a rowblock copy. For example, consider a merge where two per-rowset iterators overlap for 63/128 rows, then one of the two iterators has an additional 65 rows. In such a situation, bitmap copy operations in the block copy may not be byte-aligned. In some embodiments, a heuristic can be applied such that whole-block-copying only occurs when there is more than one row to copy.

Figure 13A:
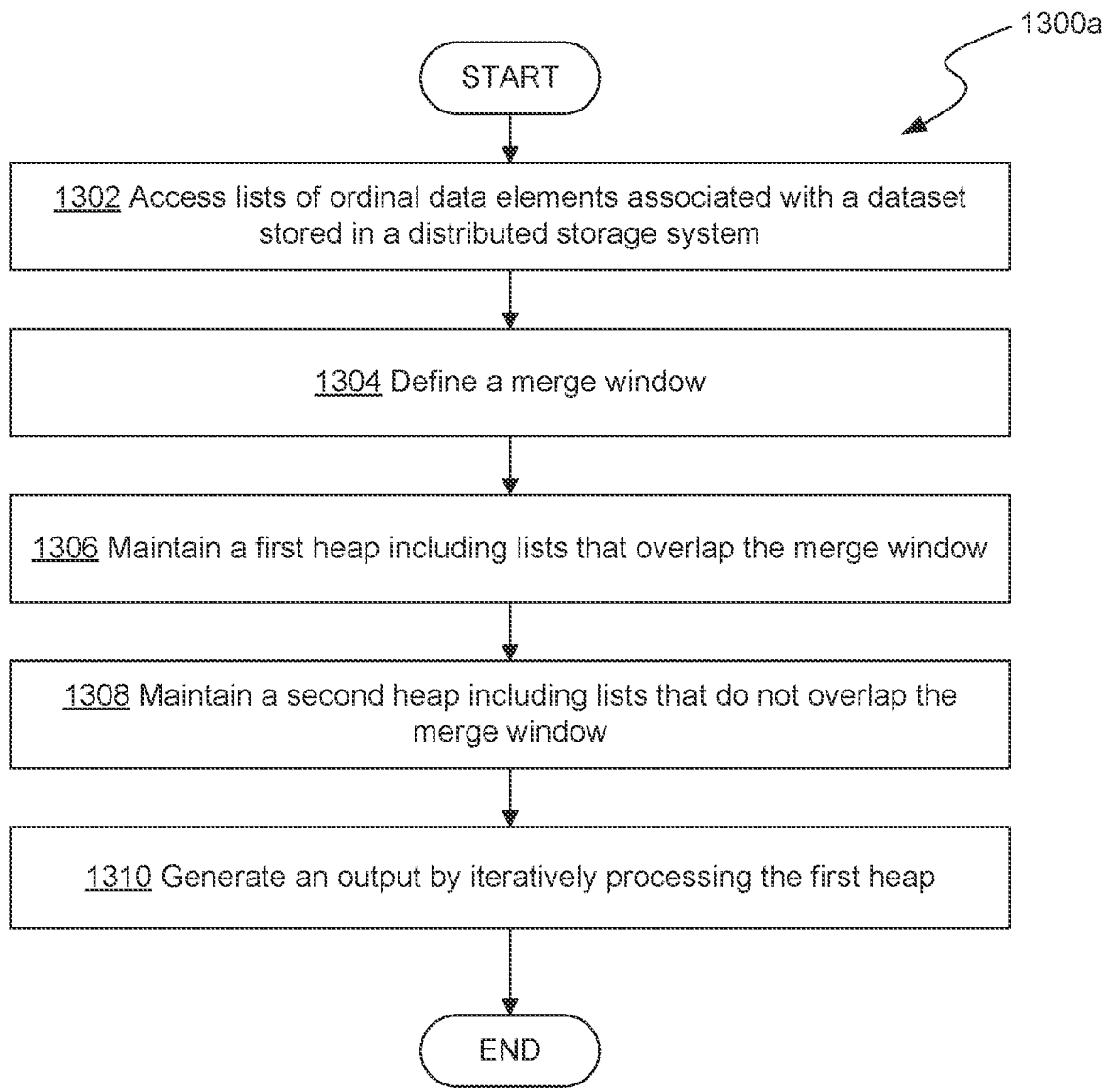
FIGS. 13A-13C show a set of flow diagrams that illustrate an example process for performing an ordered scan of elements from multiple lists, according to an embodiment of the introduced technique.
Figure 13B:
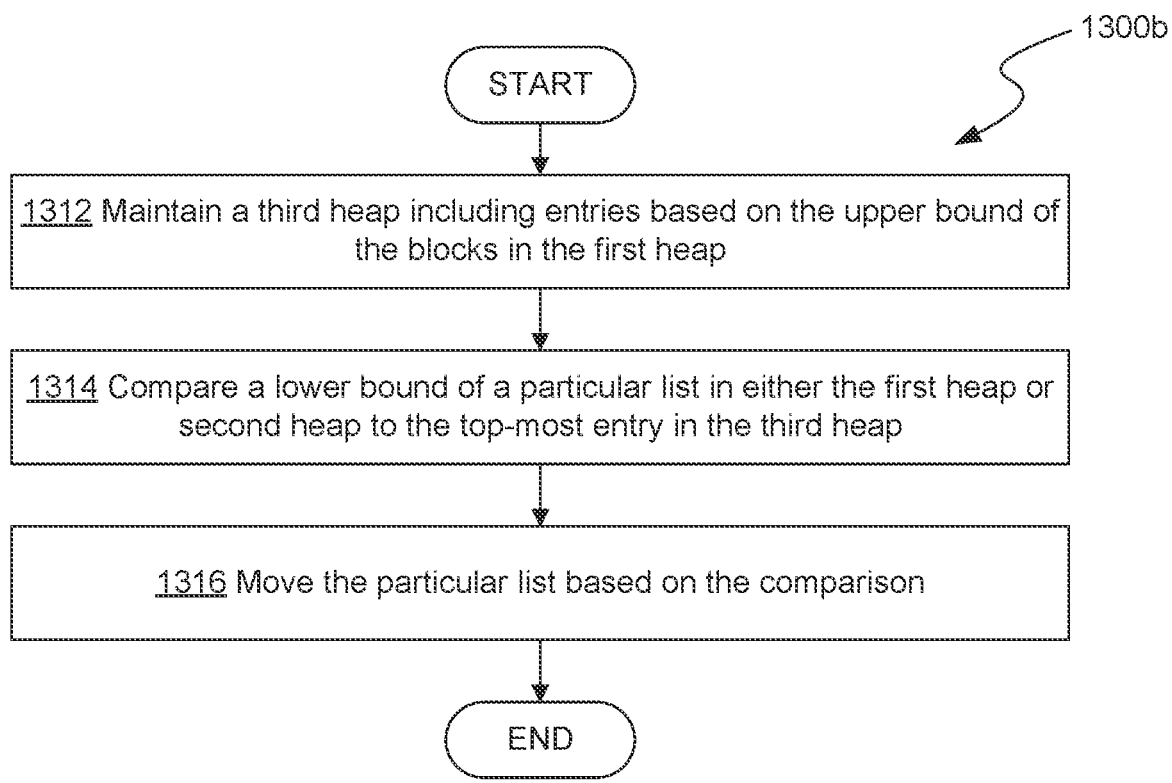
Figure 13C:
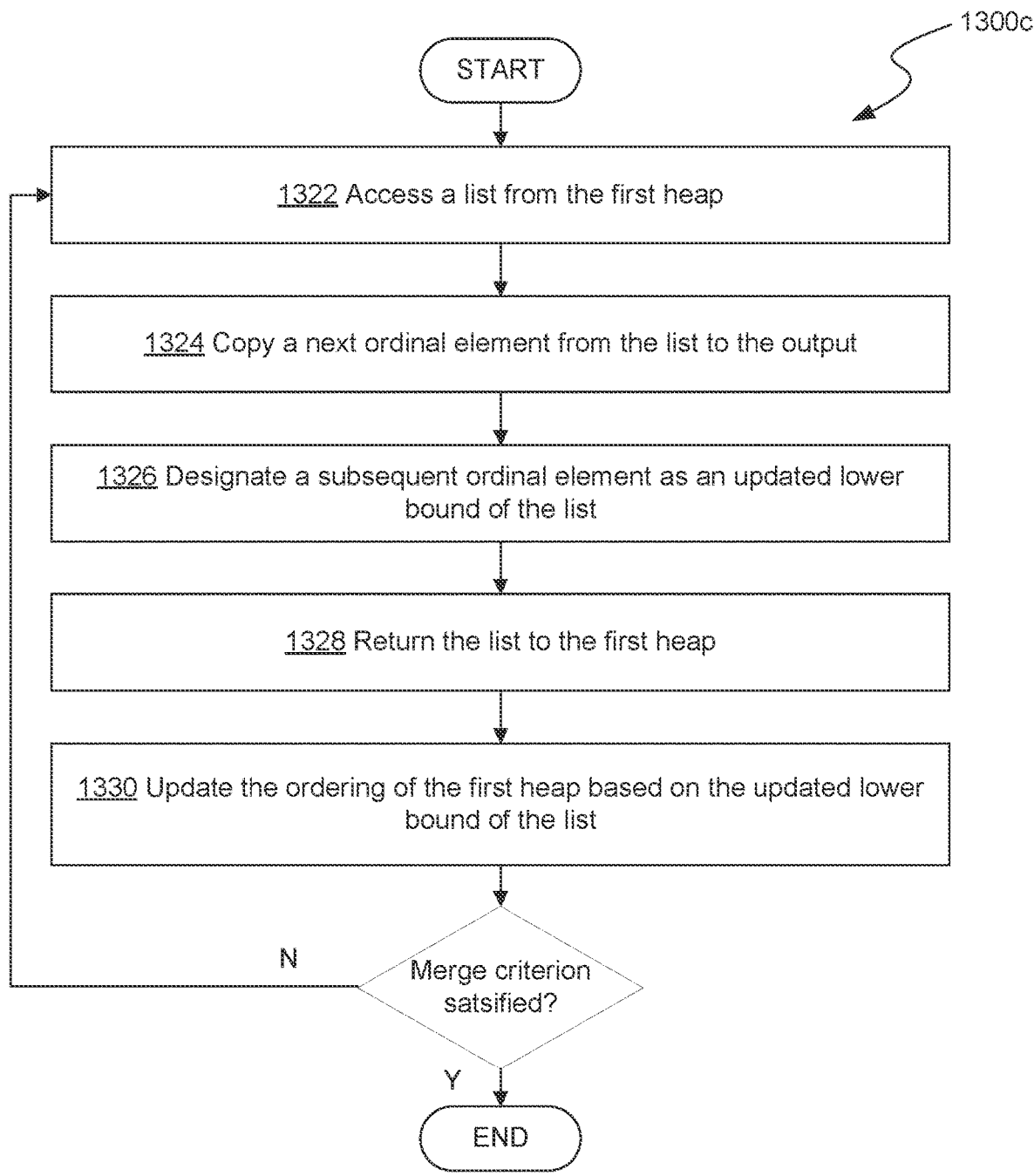

FIGS. 13A-C shows a set of flow diagrams associated with an example process for performing an ordered scan, according to an embodiment of the introduced technique. Specifically, FIG. 13A shows a flow diagram of an example process 1300a for performing an ordered scan according to an embodiment of the introduced technique. FIG. 13B shows a flow diagram of an example process 1300b for moving lists of ordinal elements between multiple heaps. FIG. 13C shows a flow diagram of an example process 1300c for iteratively processing lists of ordinal elements in an active heap to generate a sorted output. In some embodiments, processes 1300b and 1300c are sub processes of process 1300a.

Certain operations of the example processes 1300a-c are performed by components of a distributed computing system described, for example, with reference to FIG. 5. For example, certain operations may be performed by any of distributed computing engine 504, merge engine 506, or any of the tablet servers 512a-c. In some embodiments, the example processes 1300a-c can be executed by one or more of the components of a computer system such as the example processing system 1400 described with respect to FIG. 14. For example, in some embodiments, the example processes 1300a-c depicted in FIGS. 13A-C may be represented in instructions stored in memory that are then executed by a processor. The processes 1300a-c described with respect to FIGS. 13A-C are examples provided for illustrative purposes and are not to be construed as limiting. Other processes may include more or fewer operations than depicted, while remaining within the scope of the present disclosure. Further, the operations depicted in example processes 1300a-c may be performed in a different order than is shown.

With reference to FIG. 13A, example process 1300a begins at operation 1302 with accessing multiple lists of data corresponding to partitions of a dataset stored across multiple nodes in distributed computing system. Each of the lists accessed at operation 1302 may include one or more ordinal elements such as keys or other sortable data.

In the context of a horizontally partitioned table, e.g., as in Apache Kudu™, the multiple lists accessed at operation 802 may be multiple per-rowset iterators each corresponding to a different one of multiple rowsets associated with a table in a distributed computing system. As previously discussed, the multiple rowsets may be stored in one or more tablets at multiple nodes in a distributed computing system. In some embodiments, each per-rowset iterator accessed at operation 1302 may include a run of one or more keys each corresponding to a different one of one or more rows in a given rowset.

In some embodiments, the lists of ordinal elements are accessed at operation 1302 in response to a query received from a client (e.g., client 602 depicted in FIG. 6). For example, although not depicted in FIG. 13A, in some embodiments, example process 1300a may begin by receiving a query from a client that includes one or more query conditions and identifying one or more lists that include ordinal elements that satisfy the one or more query conditions. Accordingly, the lists accessed at operation 1302 may be those identified lists that satisfy the one or more query conditions.

In the context of a horizontally partitioned table, the multiple per-rowset iterators accessed at operation 1302 may be those associated with rowsets including rows in the table that satisfy the one or more query conditions. Further, the run of keys in each per-rowset iterator accessed at operation 1302 may include only those keys that correspond to the rows that satisfy the one or more query conditions.

In some embodiments, example process 1300a may include initializing, generating, defining, or otherwise creating the lists of ordinal data elements that are accessed at operation 1302. For example, in the context of horizontally partitioned table, process 1300 may include initializing, generating, defining, or otherwise creating each of the per-rowset iterators based on the rowsets of the table stored in a distributed computing system.

Example process 1300a continues at operation 1304 with defining a merge window representative of a portion of an element space of the dataset. For example, the ordinal data elements in the lists returned at operation 1302 may span an element space that runs from a smallest of all the ordinal elements to a largest of all the ordinal elements. In some embodiments, the merge window is based on the lower and upper bounds of each of the lists accessed at operation 1302. For example, the start of the merge window may be based on the lower bound of a first list (i.e., the LOW) of the multiple lists accessed at operation 1302 that is the smallest of all the lower bounds of all of the multiple lists accessed at operation 1320. The end of the merge window can then be based on the upper bound of a second list that is the smallest of all of the upper bounds of all of the lists that have lower bounds that are less than or equal to an upper bound of the first list (i.e., the LOW).

In the context of a horizontally partitioned table, the merge window may be representative of a portion of a keyspace (i.e., a keyspace interval) of the multiple per-rowset iterators and may be based on the lower and upper bounds of the multiple per-rowset iterators accessed at operation 1302. For example, the start of the merge window may be based on the lower bound of a first per-rowset iterator (i.e., the LOW) of the multiple per-rowset iterators accessed at operation 1302 that is the smallest of all the lower bounds of all of the multiple per-rowset iterators accessed at operation 1302. The end of the merge window can then be based on the upper bound of a second per-rowset iterator that is the smallest of all of the upper bounds of all of the per-rowset iterators that have lower bounds that are less than or equal to an upper bound of the first per-rowset iterator (i.e., the LOW). As previously discussed, this is just an example rule for defining the start and end of the merge window. Other embodiments may define the merge window differently. Further, as also previously discussed, since the bounds of the multiple per-rowset iterators change over time as the iterative merge progresses, the start and end of the merge window will also move or advance.

Example process 1300a continues with splitting the multiple lists accessed at operation 1302 into multiple groups based on whether they overlap the merge window defined at operation 1304. For example, in some embodiments, one or more lists that overlap the merge window are assigned to a first group while the remainder of the lists that do not overlap the merge window are assigned to a second list. The lists assigned to the first group can be conceptualized as participating in the merge while the lists assigned to the second group can be conceptualized as not participating in the merge. Again, lists can move between the two groups as their bounds change during the iterative merge process and as the merge window advances.

In some embodiments, the multiple lists are split into multiple groups by maintaining multiple heap-based data structures. For example, as shown in FIG. 13A, example process 1300a may include maintaining a first heap, including one or more of the lists that overlap the merge window (operation 1306) and maintaining a second heap, including the remainder of the lists that do not overlap the merge window (operation 1308). In some embodiments, both the first and second heaps are min-heaps that are ordered based on the lower bounds of the lists included in each heap. In other words, in each heap, the list with the smallest lower bound will be the top-most list in the min-heap.

In the context of a horizontally partitioned table, operation 1306 may include maintaining a first heap including one or more of the multiple per-rowset iterators that overlap the merge window (e.g., similar to Hot Heap 1110 in FIG. 11) and operation 1308 may include maintaining a second heap including a remainder of the multiple per-rowset iterators that do not overlap the merge window (e.g., similar to Cold Heap 1112 in FIG. 11). In some embodiments, both the first and second heaps are min-heaps that are ordered based on the lower bounds of the per-rowset iterators included in each heap. In other words, in each min-heap, the per-rowset iterator with the smallest lower bound will be the top-most iterator in the min-heap.

Although not depicted in FIG. 13A, in some embodiments, a third heap may be maintained to assist in determining when to move a list of ordinal data (or a per-rowset iterator) between the first heap and the second heap. An example embodiment of a process for moving a list of ordinal data (or a per-rowset iterator) between the first heap and the second heap during the merge is depicted in the flow chart of FIG. 13B.

Returning to FIG. 13A, example process 1300a continues at operation 1310 with generating an output comprising a sorted list of ordinal elements from the multiple lists accessed at operation 1302 by iteratively processing the first group (e.g., the first min heap of operation 1306). In the context of a horizontally partitioned table, operation 1310 may include generating an output comprising a sorted list of keys from the multiple rowsets corresponding to the per-rowset iterators by iterative processing the per-rowset iterators in the first heap. An example embodiment of the iterative processing of the first (active) heap is depicted in the flow chart of FIG. 13C.

As mentioned, FIG. 13B shows a flow diagram of an example process 1300b for moving lists of ordinal elements between multiple heaps. Example process 1300b begins at operation 1312 with maintaining a third heap that includes one or more entries, where each entry is based on an upper bound of a different one of the one or more lists in the first min-heap. Where this third heap is a min-heap the top most entry will correspond with the end of the merge window. In the context of a horizontally partitioned table, the one or more entries in the third heap may be based on an upper bound of a different one of the one or more per-rowset iterators in the first heap, for example, similar to the Hot Max Heap 1114 described with respect to FIG. 11.

Example process 1300b continues with comparing a lower bound of a particular list in either the first heap of second heap to the top-most entry in third heap to determine if the particular list overlaps the merge window and at operation 1316 with moving the particular list, if necessary, based on the comparison.

If the particular list is in the first heap, example process 1300b may include determining, based on the comparison at operation 1314, that the lower bound of the particular list is greater than the top-most entry in the third heap, and operation 1316 may include moving the particular list in the first heap to the second heap, in response to the determination, since the particular list no longer overlaps the merge window. In such an example, the particular list in the first heap may be a list that has just completed a copy of an ordinal element to the output. Conversely, if the particular list is in the second heap, example process 1300b may include determining, based on the comparison at operation 1314, that the lower bound of the particular list is less than or equal to the top-most entry in the third heap, and operation 1316 may include moving the particular list in the second heap to the first heap in response to the determination, since the particular list now overlaps the merge window. In such an example, the particular list in the second heap may be the top-most list in the second heap, since it is closest to the end of the merge window and therefore the best candidate for moving into the first heap.

In the context of a horizontally partitioned table, operation 1314 may include comparing a lower bound of a particular per-rowset iterator and moving the particular per-rowset iterator to another heap, if necessary, based on the comparison, for example, as described with respect to FIG. 11. Specifically, If the particular per-rowset iterator is in the first heap (e.g., Hot Heap 1110), example process 1300b may include determining, based on the comparison at operation 1314, that the lower bound of the particular per-rowset iterator is greater than the top-most entry in the third heap (i.e., Hot Max Heap 1114), and operation 1316 may include moving the particular per-rowset iterator in the first heap to the second heap, in response to the determination, since the particular per-rowset iterator no longer overlaps the merge window. In such an example, the particular per-rowset iterator in the first heap may be a per-rowset iterator that has just completed a copy of a key to the output. Conversely, if the particular per-rowset iterator is in the second heap (i.e., Cold Heap 1112), example process 1300b may include determining, based on the comparison at operation 1314, that the lower bound of the particular per-rowset iterator is less than or equal to the top-most entry in the third heap (e.g., Hot Max Heap 1114), and operation 1316 may include moving the particular per-rowset iterator in the second heap to the first heap in response to the determination, since the particular per-rowset iterator now overlaps the merge window. In such an example, the particular per-rowset iterator in the second heap may be the top-most per-rowset iterator in the second heap since it is closest to the end of the merge window and therefore the best candidate for moving into the first heap.

FIG. 13C shows a flow diagram of an example process 1300c for iteratively processing lists of ordinal elements in an active heap to generate a sorted output. As previously mentioned, in some embodiments, example process 1300c may be a sub-operation of operation 1310 of example process 1300a.

Example process 1300c begins at operation 1322 with obtaining, removing, popping, or otherwise accessing a list from the first (i.e., active) heap. In particular, operation 1322 may include accessing the list in the top-most position of first heap, since that list will have the next smallest lower bound in the active first heap.

In the context of a horizontally partitioned table, operation 1322 may include obtaining, removing, popping, or otherwise accessing a per-rowset iterator from the first heap (e.g., Hot Heap 1110). Again, in some embodiments, the per-rowset iterator accessed at operation 1322 will be the top-most iterator in the first heap, for example, as described with respect to FIG. 12.

Example process 1300c continues at operation 1324 with copying a next non-exhausted ordinal element in the list accessed at operation 1320 to the output. In particular, operation 1324 may include copying the next smallest ordinal element in the list that has not already been copied to the output. In the context of a horizontally partitioned table, operation 1324 may include copying a next non-exhausted key from the per-rowset iterator accessed at operation 1322 to the output, for example, as described with respect to FIG. 12.

In some embodiments, only one ordinal element (or key) from the accessed list (or iterator) is copied at operation 1324. This is because a next smaller ordinal element (or key) may be part of a different list (or iterator) in the first heap. In other words, in the context of a horizontally partitioned table, keys are copied to the output row-by-row. However, in some embodiments, a "whole block" optimization may be applied when there is only one list (or iterator) in the first heap. Accordingly, although not depicted in FIG. 13C, in some embodiments, example operation 1324 may include copying a block of up to all of the non-exhausted ordinal elements from the accessed list to the output in response to determining that the accessed list is the only list in the first heap. In the context of a horizontally partitioned table, operation 1324 may include copying a block of up to all of the non-exhausted keys from the accessed per-rowset iterator to the output in response to determining that the accessed iterator is the only iterator in the first heap (e.g., Hot Heap 1110). In any case, when applying such an optimization, the block of elements copied at operation 1324 may include all of the non-exhausted elements or some subset of all the non-exhausted elements (e.g., a specified quantity, amount of data, etc.).

Example process 1300c continues at operation 1326 with designating a subsequent ordinal element in the list as an updated lower bound for the list after copying (and thereby exhausting) the ordinal element at operation 1324. In the context of a horizontally partitioned table, operation 1326 may include designating a subsequent key in the per-rowset iterator as an updated lower bound for the per-rowset after copying (and thereby exhausting) the key at operation 1324, for example as described with respect to FIG. 12.

Example process 1300c continues at operation 1328 with returning the list to the first heap and at operation 1330 with updating the ordering of the first heap based on the updated lower bound of the retuned list. In the context of a horizontally partitioned table, operation 1328 may include returning the per-rowset iterator to the first heap (e.g., Hot Heap 1110), and operation 1330 may include updating the ordering of the first heap based on the updated lower bound of the turned per-rowset iterator. For example, as described with respect to FIG. 12, when returned to the first heap, the updated lower bound of the returned per-rowset iterator may no longer be the smallest lower bound in the heap, thereby requiring that the returned per-rowset iterator fall out of the top-most position in the first heap.

The process of generating the merged output is an iterative process. In other words, the operations of example process 1300c may be performed multiple times until a specified merge criterion is satisfied. For example, as described with respect to FIG. 12, after returning an iterator to the first heap (i.e., after copying a key to the output) and updating the ordering of the first heap, the iterative merge process may include popping or otherwise accessing a second iterator from the top of the first heap to restart the copying process. A subsequent iterator popped from the first heap may be the same as the previous iterator if the order of the first heap has not changed or may be different than the previous iterator if the order of the first heap has changed.

Further, as the iterative merge process progresses (i.e., through repeated performance of example process 1300c), the bounds of the multiple iterators will change thereby advancing (i.e., updating) the start and end of the merge window. Accordingly, although not depicted in FIG. 13C, in some embodiments, example process 1300c may include updating the start and end of the merge window based on the updated bounds of the one or more lists in the first and second heaps. As the merge window advances (i.e., is updated), some iterators in the first heap (e.g., Hot Heap 1110) may move to the second heap (e.g., Cold Heap 1112), and/or some iterators in the second heap may move to the first heap, for example, by applying example process 1300b of FIG. 13B. Accordingly, although not depicted in FIG. 13C, in some embodiments, example process 1300c may include determining if the list (or iterator) still overlaps the merge window based on the updated bounds of the iterator and moving the iterator to the second heap in response to determining that the iterator does not overlap the merge window.

The merge criterion used to determine whether the merge is complete may be different in various embodiments. For example, in some embodiments, operations 1322-1330 are repeated until all of the ordinal elements (e.g., keys) are copied from the multiple lists (or iterators) to the output. Alternatively, in some embodiments, operations 1322-1330 are repeated until a specified number of keys, amount of data, etc. has been copied to the output. Other types of merge criteria can similarly be implemented.

Computer Processing System

Figure 14:
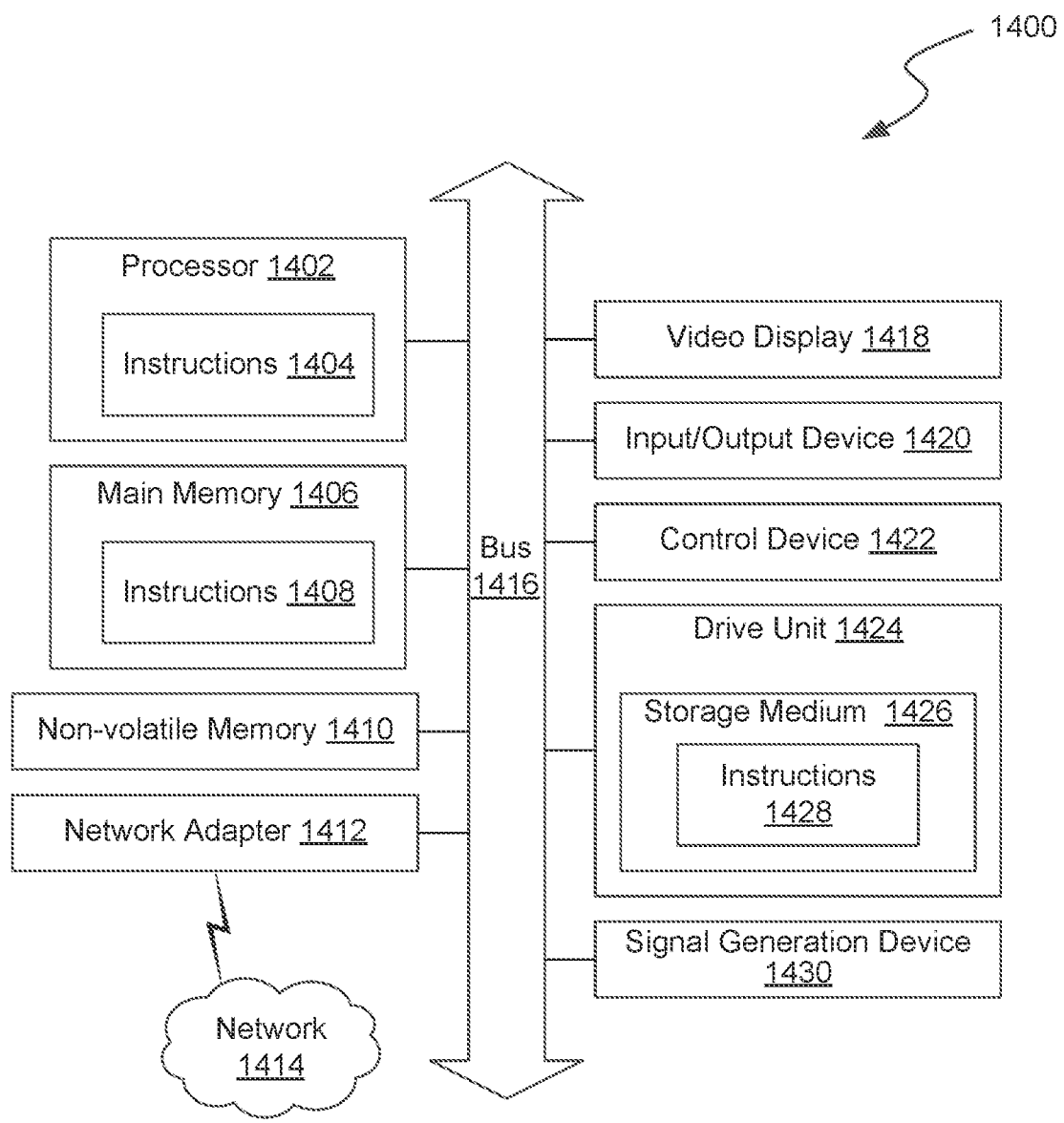
FIG. 14 shows a block diagram that illustrates an example computer processing system in which at least some operations associated with the introduced technique can be implemented.

FIG. 14 is a block diagram illustrating an example of a computer processing system 1400 in which at least some operations described herein can be implemented. For example, some components of the computer processing system 1400 may be part of any one or more of the components of a distributed computing system, for example, as described with respect to FIG. 5.

The processing system 1400 may include one or more central processing units ("processors") 1402, main memory 1406, non-volatile memory 1410, network adapter 1412 (e.g., network interface), video display 1418, input/output devices 1420, control device 1422 (e.g., keyboard and pointing devices), drive unit 1424, including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1400 may share a similar computer processor architecture as that of a server computer, a desktop computer, a tablet computer, personal digital assistant (PDA), mobile phone, a wearable electronic device (e.g., a watch or fitness tracker), network-connected ("smart") device (e.g., a television or home assistant device), virtual/augmented reality systems (e.g., a head-mounted display), or any other electronic device capable of executing a set of instructions (sequential or otherwise) that specify action(s) to be taken by the processing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the processing system 1400.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for performing an ordered scan on a table in a distributed computing system, the table comprising a plurality of tablets, each of the plurality of tablets comprising one or more of a plurality of rowsets, the method comprising:
   accessing a plurality of per-rowset iterators, each of the plurality of per-rowset iterators including a run of keys associated with rows of a corresponding rowset;
   maintaining a first heap including one or more of the plurality of per-rowset iterators that overlap a merge window, the merge window being representative of a portion of a keyspace of the plurality of per-rowset iterators; and
   iteratively processing the first heap so as to generate an output comprising a sorted list of keys from the plurality of rowsets.

2. The method of claim 1, wherein the run of keys in each of the plurality of per-rowset iterators has a lower bound and an upper bound, and wherein the merge window is based on the lower bounds and upper bounds of the plurality of per-rowset iterators.

3. The method of claim 2, further comprising:
   updating the lower bound and/or upper bound of a particular per-rowset iterator of the plurality of per-rowset iterators during the iterative processing of the first heap; and
   updating the merge window based on the updated the lower bound and/or upper bound of the particular per-rowset iterator.

4. The method of claim 1, wherein the run of keys in each of the plurality of per-rowset iterators have a lower bound and an upper bound, wherein the merge window has a start and an end, wherein:
   the start of the merge window is based on a particular lower bound of a first per-rowset iterator of the plurality of per-rowset iterators, wherein the particular lower bound is the smallest of all the lower bounds of all of the plurality of per-rowset iterators; and
   the end of the merge window is based on a particular upper bound of a second per-rowset iterator, wherein the particular upper bound is the smallest of all of the upper bounds of all of the per-rowset iterators that have lower bounds that are less than or equal to an upper bound of the first per-rowset iterator.

5. The method of claim 4, wherein the first per-rowset iterator is the same as the second per-rowset iterator.

6. The method of claim 1, wherein the run of keys in each of the plurality of per-rowset iterators have a lower bound and an upper bound, wherein the merge window has a start and an end, wherein:
the start of the merge window is based on a particular lower bound of a particular per-rowset iterator of the plurality of per-rowset iterators, wherein the particular lower bound is the smallest of all the lower bounds of all of the plurality of per-rowset iterators; and
the end of the merge window is based on a particular upper bound of the particular per-rowset iterator.

7. The method of claim 1, wherein the run of keys in each of the plurality of per-rowset iterators has a lower bound and an upper bound, and wherein the lower bound and upper bound of each of the plurality of per-rowset iterators are predefined by a distributed computing engine that manages the table.

8. The method of claim 1, further comprising:
maintaining a second heap including one or more entries, each of the one or more entries based on an upper bound of a different one of the one or more of the plurality of per-rowset iterators in the first heap.

9. The method of claim 8, further comprising:
comparing a lower bound of a particular per-rowset iterator in a third heap to a top-most entry in the second heap, the third heap including a remainder of the plurality of per-rowset iterators that do not overlap the merge window;
determining, based on the comparing, that the lower bound of the particular per-rowset iterator is less than or equal to the top-most entry in the second heap; and
moving the particular per-rowset iterator from the third heap to the first heap in response to determining that the lower bound of the particular per-rowset iterator is less than or equal to the top-most entry in the second heap.

10. The method of claim 8, further comprising:
comparing a lower bound of a particular per-rowset iterator in the first heap to a top-most entry in the second heap;
determining, based on the comparing, that the lower bound of the particular per-rowset iterator is greater than the top-most entry in the second heap; and
moving the particular per-rowset iterator from the first heap to a third heap in response to determining that the lower bound of the particular per-rowset iterator is greater than the top-most entry in the second heap.

11. The method of claim 1, further comprising:
moving at least some of the plurality of per-rowset iterators between the first heap and a second heap during the iterative processing of the first heap.

12. The method of claim 1, wherein iteratively processing the first heap includes:
performing a merge process using the first heap, the merge process including:
popping a particular per-rowset iterator from a top-most position in the first heap;
copying a particular non-exhausted key of one or more non-exhausted keys in the run of keys of the particular per-rowset iterator to the output, the particular non-exhausted key corresponding to a current lower bound of the particular per-rowset iterator, wherein the non-exhausted keys include any keys in the run of keys that are not yet copied to the output;
designating a subsequent key of the particular per-rowset iterator as an updated lower bound of the particular per-rowset iterator;
returning the particular per-rowset iterator to the first heap; and
updating the ordering of the one or more per-rowset iterators in the first heap based on the updated lower bound of the particular per-rowset iterator; and
repeating the merge process until a merge criterion is satisfied.

13. The method of claim 12, wherein the merge criterion is satisfied when all keys associated with the plurality of per-rowset iterators are copied to the output.

14. The method of claim 12, wherein the merge process further includes:
determining that the particular per-rowset iterator is the only per-rowset iterator in the first heap; and
copying all the non-exhausted keys in the run of keys of the particular per-rowset iterator to the output in response to determining that the particular per-rowset iterator is the only per-rowset iterator in the first heap.

15. The method of claim 12, further comprising:
updating the merge window based on the updated lower bound of the particular per-rowset iterator.

16. The method of claim 1, wherein the first heap is a min-heap and is ordered based on lower bounds of the one or more of the plurality of per-rowset iterators that overlap the merge window.

17. The method of claim 1, further comprising:
receiving a query request from a client, the query request including one or more query conditions;
wherein the runs of keys of the plurality of per-rowset iterators are associated with rows in the table that satisfy the one or more query conditions.

18. The method of claim 1, wherein the table is managed in the distributed computing system using Apache Kudu™.

19. A non-transitory computer-readable storage medium storing instructions for performing an ordered scan on a table in a distributed computing system, the table comprising a plurality of tablets, each of the plurality of tablets comprising one or more of a plurality of rowsets, wherein the instructions when executed cause a computer processor to perform a method comprising:
accessing a plurality of per-rowset iterators, each of the plurality of per-rowset iterators including a run of keys associated with rows of a corresponding rowset;
maintaining a first heap including one or more of the plurality of per-rowset iterators that overlap a merge window, the merge window being representative of a portion of a keyspace of the plurality of per-rowset iterators; and
iteratively processing the first heap so as to generate an output comprising a sorted list of keys from the plurality of rowsets.

20. A system comprising:
a computer processor; and
a non-transitory computer-readable storage medium storing instructions for performing an ordered scan on a table in a distributed computing system, the table comprising a plurality of tablets, each of the plurality of tablets comprising one or more of a plurality of rowsets, the instructions when executed causing the computer processor to perform actions comprising:
accessing a plurality of per-rowset iterators, each of the plurality of per-rowset iterators including a run of keys associated with rows of a corresponding rowset;

maintaining a first heap including one or more of the plurality of per-rowset iterators that overlap a merge window, the merge window being representative of a portion of a keyspace of the plurality of per-rowset iterators; and iteratively processing the first heap so as to generate an output comprising a sorted list of keys from the plurality of rowsets.

\* \* \* \* \*